United States Patent [19]
Kubo

[11] Patent Number: 5,489,769
[45] Date of Patent: Feb. 6, 1996

[54] SYMBOL INFORMATION READING APPARATUS

[75] Inventor: Mitsunori Kubo, Tokyo, Japan

[73] Assignee: Olympus Optical Co., Ltd., Tokyo, Japan

[21] Appl. No.: 66,968

[22] Filed: May 25, 1993

[30] Foreign Application Priority Data

May 26, 1992 [JP] Japan ................... 4-133783

[51] Int. Cl.⁶ ........................... G06K 7/10
[52] U.S. Cl. ........................... 235/462; 235/463
[58] Field of Search ........................... 235/462, 463; 382/46

[56] References Cited

U.S. PATENT DOCUMENTS

| | | | |
|---|---|---|---|
| 4,873,426 | 10/1989 | Sarna et al. | 235/462 |
| 4,948,955 | 8/1990 | Lee et al. | 235/462 |
| 5,063,526 | 11/1991 | Kagawa et al. | 382/46 X |
| 5,093,653 | 3/1992 | Ikehira | 382/46 X |
| 5,126,544 | 6/1992 | Izumi | 235/462 |
| 5,134,272 | 7/1992 | Tsuchiya et al. | 235/462 |
| 5,155,343 | 10/1992 | Chandler et al. | 235/462 |
| 5,200,598 | 4/1993 | Rencontre | 382/46 X |
| 5,245,676 | 9/1993 | Spitz | 382/46 |
| 5,319,181 | 6/1994 | Shellhammer et al. | 235/462 |

FOREIGN PATENT DOCUMENTS 0385478  9/1990  European Pat. Off. .

*Primary Examiner*—Donald T. Hajec
*Assistant Examiner*—Jeffrey R. Filipek
*Attorney, Agent, or Firm*—Frishauf, Holtz, Goodman, Langer & Chick

[57] ABSTRACT

A bar code symbol imaged by a two-dimensional imaging apparatus is stored in a frame memory. Based on the stored information, a position sensing section of a data processing apparatus senses position information units of at least two points from among position information units of four corners of the bar code image symbol projected on a photo-electric conversion surface of the two-dimensional imaging apparatus. On the basis of the sensed position information units, a slope sensing section estimates position information of the bar code symbol. Based on this position information, a reading section successively reads information of the bar code symbol from the frame memory. A decoding section decodes the read information to the original information.

16 Claims, 28 Drawing Sheets

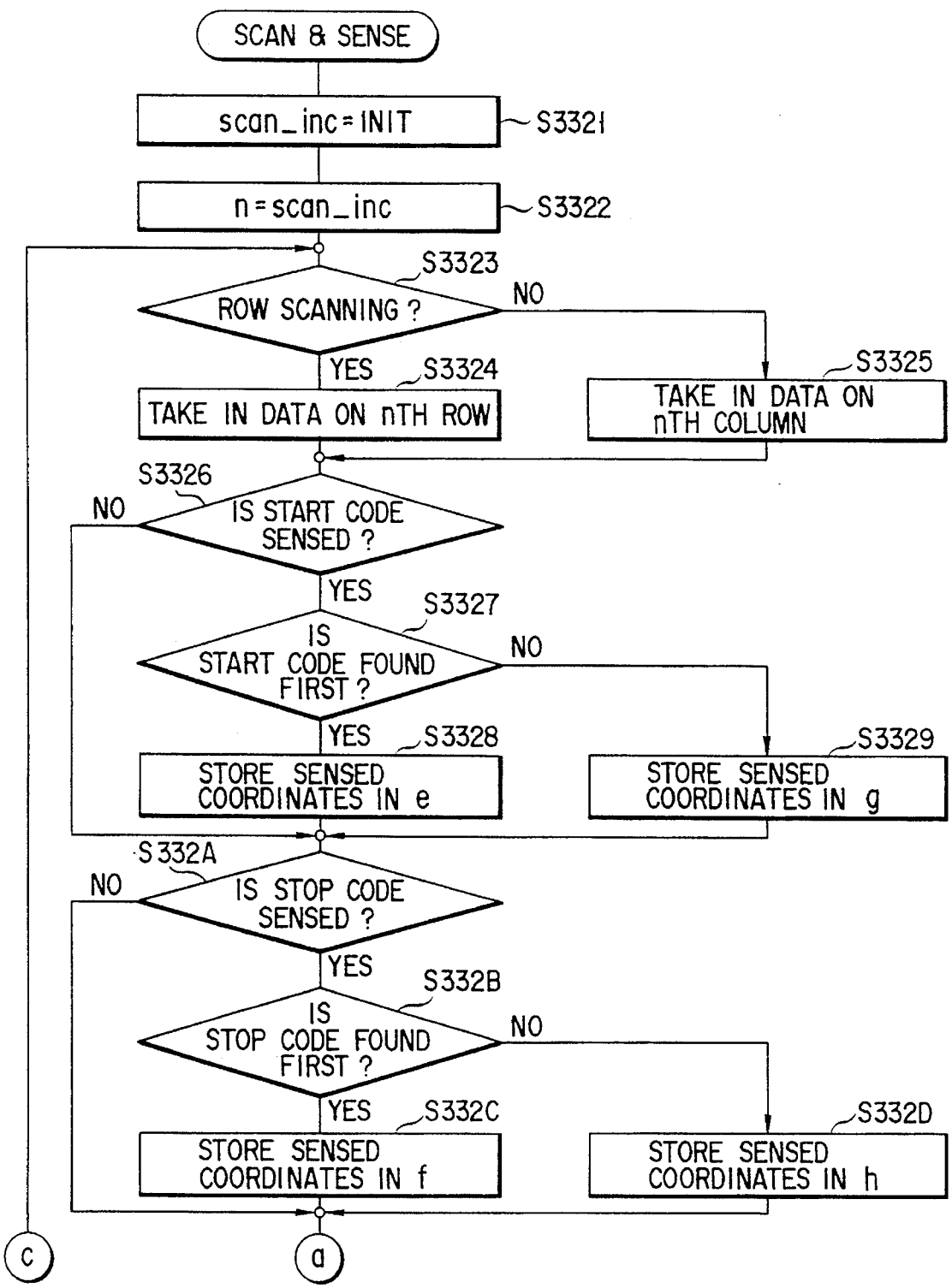
F I G. 11A

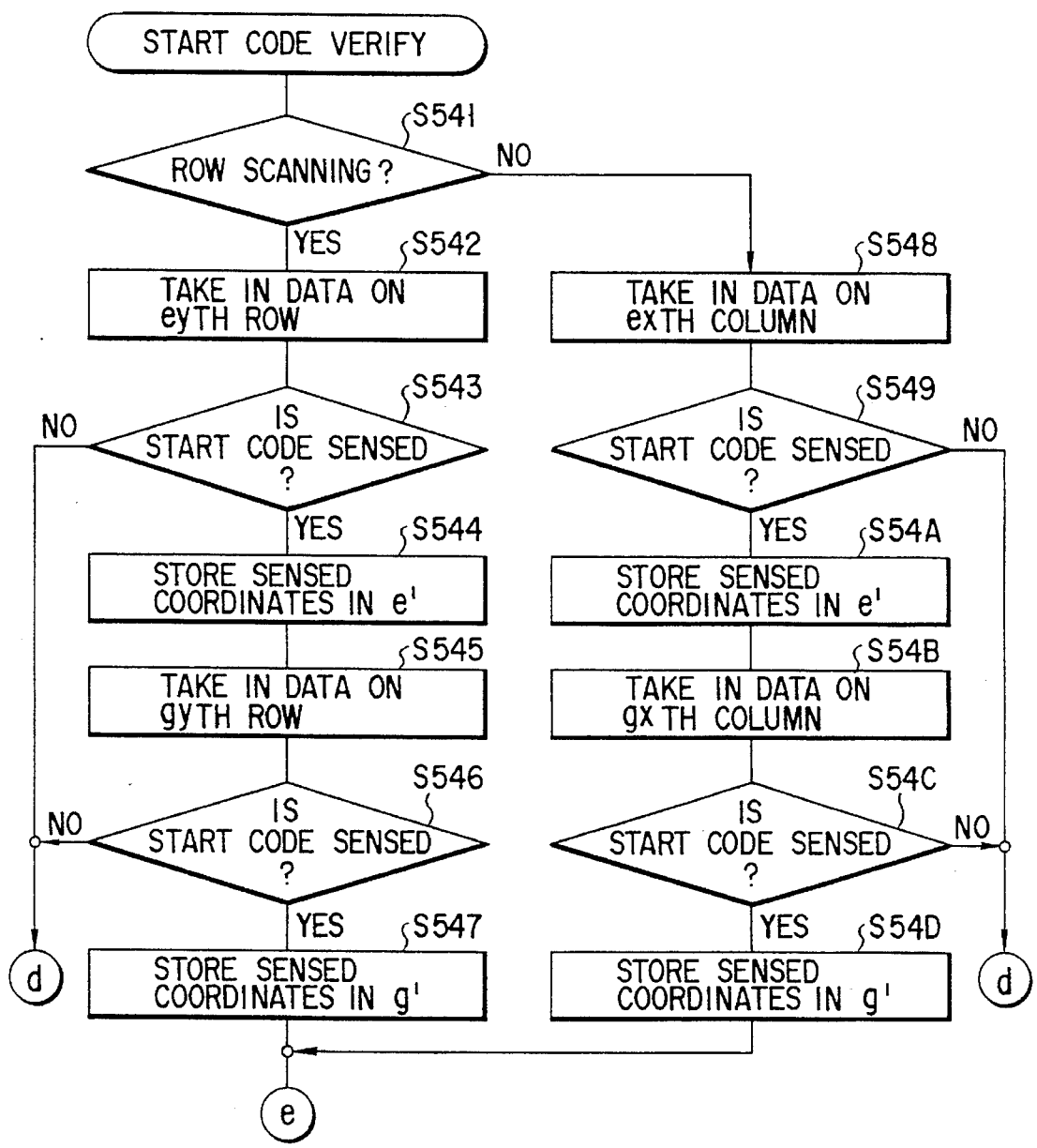
F I G. 16A

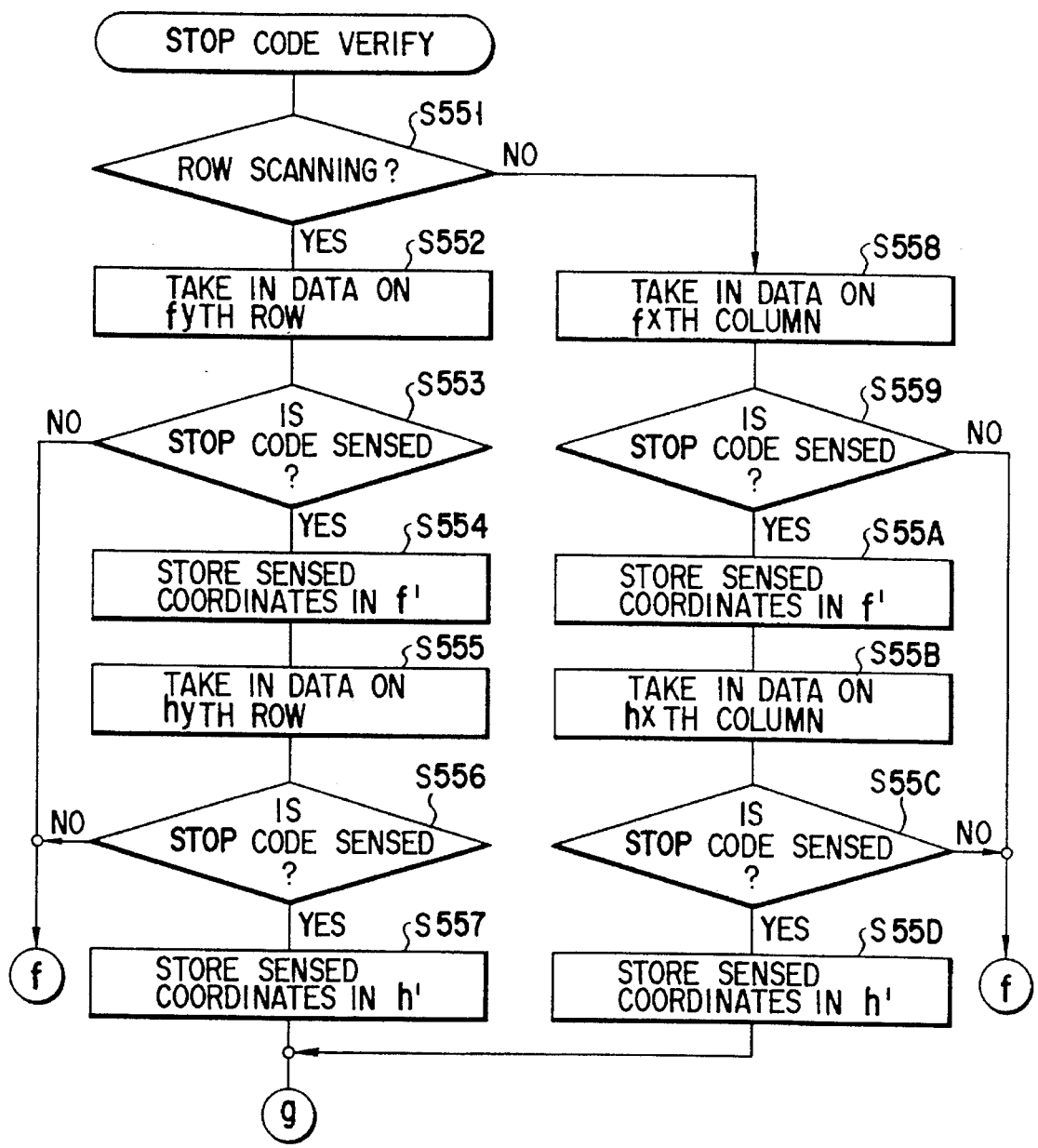
F I G. 17A

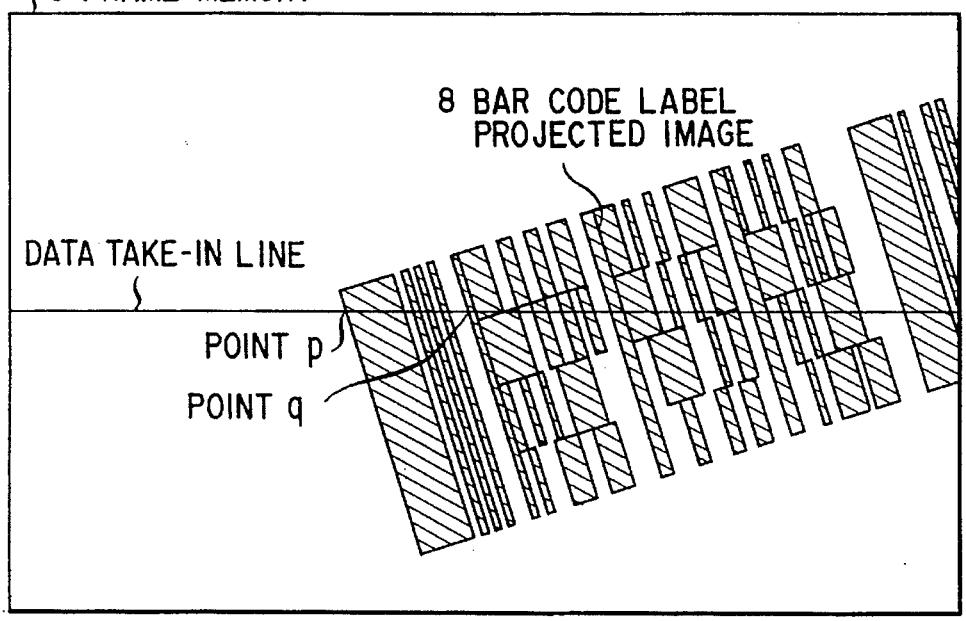
F I G. 19
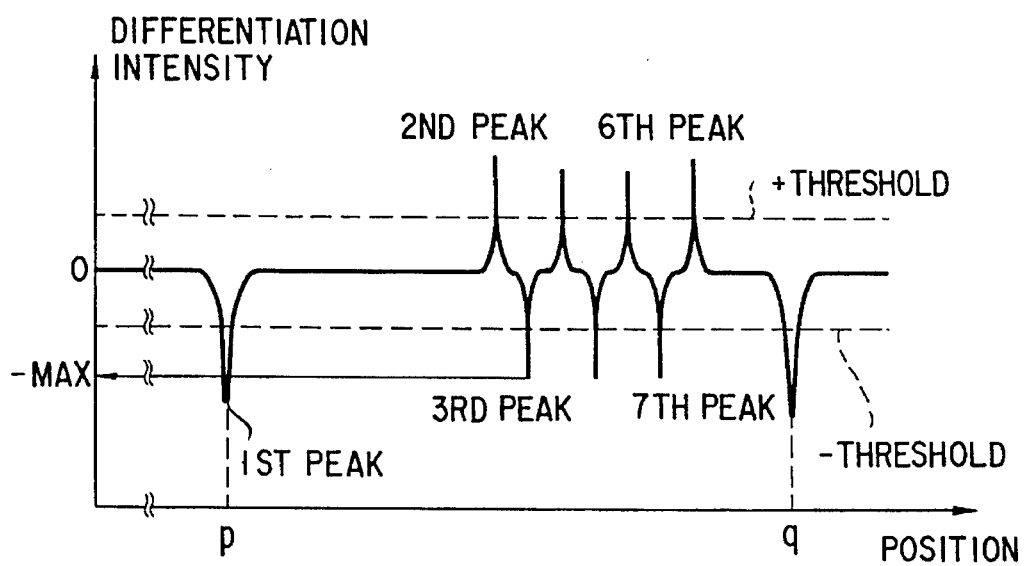
F I G. 20

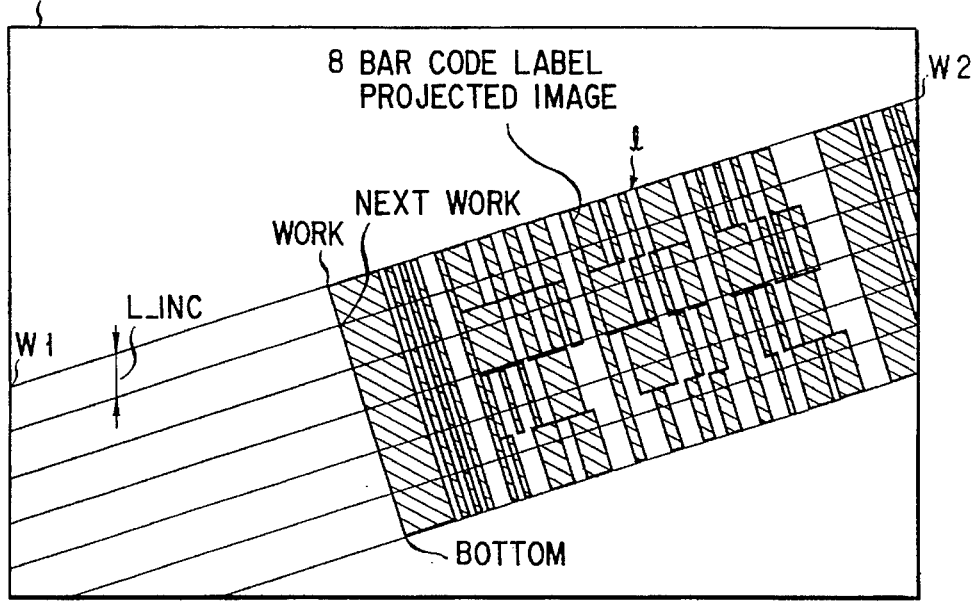
F I G. 22
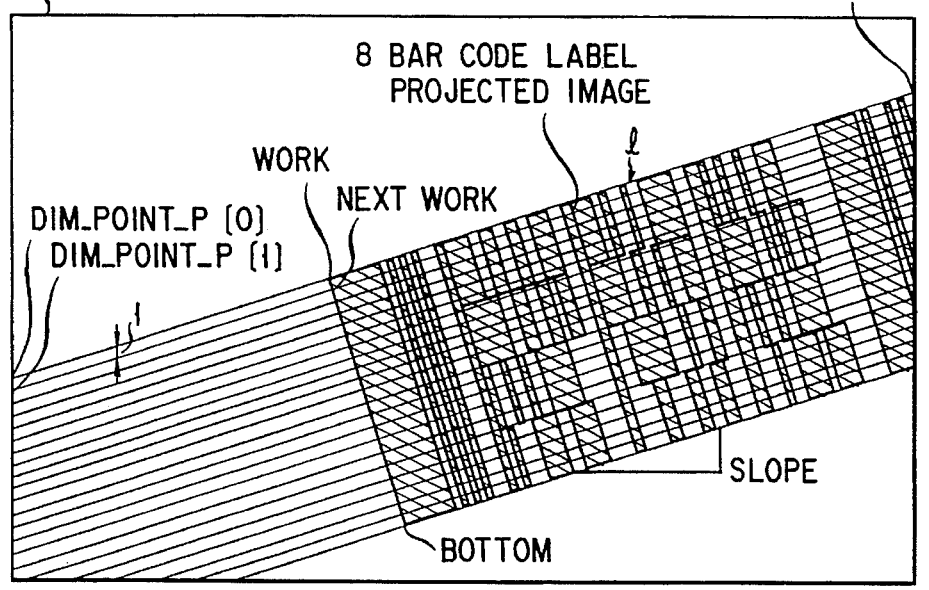
F I G. 24

SYMBOL INFORMATION READING APPARATUS

BACKGROUND OF THE INVENTION

1. Field of the Invention

The present invention relates to a symbol information reading apparatus for reading symbol; information such as bar codes.

2. Description of the Related Art

With the recent remarkable spread of POS (Point of Sales) information management systems, bar codes have become familiar to the public. A bar code is a symbol consisting of bars and spaces combined in parallel to form a single bar code character. If necessary, a character group including check digits is added in parallel to the bar code character. In addition, predetermined patterns, such as start and stop characters, are attached before and after the bar code character or the combination of the bar code character and the predetermined patterns.

JAN (Japan Article Number) is a standardized bar code system widely used for general consumer goods. Another application of bar codes is a distribution material symbol. This symbol is added to the JAN code in the form of a distribution identification code of one or two digits.

Any of the above bar code symbols is called a one-dimensional bar code. The amount of information that those code systems can handle is several tens of bytes at most.

Recently, however, there has been a strong demand for a bar code capable of having a greater amount of information. To meet the demand, various symbol systems called two-dimensional bar codes have been proposed.

According to these symbol systems, a remarkably large amount of information can be coded, as compared to one-dimensional bar code systems. Specifically, the amount of information is increased by stacking one-dimensional bar codes. The symbols of these systems are called stacked bar codes. These types of stacked bar codes include a code system called PDF-417.

An example of a conventional symbol information reading apparatus for reading stacked bar codes is a laser scan type apparatus disclosed, e.g. in Published Unexamined Japanese Patent Application (PUJPA) No. 2-268382. According to this apparatus, a laser beam is scanned two-dimensionally, thereby reading and decoding bar code symbol information.

However, the laser type bar code symbol information reading apparatus as disclosed in PUJPA No. 2-268382 has a problem: since scan information is successively analyzed, bar code symbol information cannot exactly be read unless the direction of arranged bar codes on an image region (hereinafter referred to as "label") of a bar code symbol is made substantially parallel to the direction of scanning.

Of course, the same problem lies in the one-dimensional bar code symbol information reading apparatus. In particular, the height of one row of bar codes of the stacked bar code symbol is less than the height of the bar codes of the one-dimensional bar code symbol. Thus, the control of the scan angle is important in the case of the stacked bar code label, and the stacked bar code label needs to be set on the label detection surface of the reading apparatus in the exact direction. Accordingly, the direction of the label must be varied many times until the information is read exactly, and the high-speed information input which characterizes the bar codes cannot be achieved.

Furthermore, PUJPA No. 2-268383 discloses an apparatus wherein bar codes are scanned by a two-dimensional imaging apparatus, an image of the bar codes is stored in a memory, and a bar code symbol information is decoded on the basis of the data stored in the memory.

This bar code symbol information reading apparatus using the two-dimensional imaging apparatus, however, has the same problem as the laser type apparatus: unless the direction of arranged bar codes on the label is set to be substantially parallel to the XY direction of the two-dimensional imaging apparatus, i.e. the direction of address of the image memory, the bar code symbol information cannot exactly be read. Although PUJPA No. 2-268383 states that bar codes can be read even when the direction of the arranged bar codes is not parallel to the XY direction, an actual method for reading is not taught. In addition, this prior art reference is silent on the case where a bar code label is scanned outside the field of vision of the imaging apparatus.

SUMMARY OF THE INVENTION

The object of the present invention is to provide a symbol information reading apparatus capable of reading bar code symbol information even if a bar code label (in particular, stacked bar code label) is set in any direction on a label sensing surface of the reading apparatus, or a picked-up image of the bar code label is defective.

According to a first aspect of the invention, there is provided a symbol information reading apparatus, comprising: imaging means for obtaining a two-dimensional image of a bar code including bars and spaces; position sensing means for sensing at least two points of a predetermined pattern determined in accordance with the type of the bar code, on the basis of the two-dimensional image of the bar code obtained by the imaging means; slope sensing means for sensing a slope of the bar code from the positions of the two points sensed by the position sensing means; and reading means for successively reading information of the bar code from the two-dimensional image of the bar code obtained by the imaging means, on the basis of the information obtained by the slope sensing means.

In the symbol information reading apparatus according to the first aspect of the invention, the position sensing means senses, from the two-dimensional image of the bar code obtained by the imaging means for imaging the bar code symbol as a two-dimensional image, position information units of at least two points of a predetermined pattern determined in accordance with the type of the bar code, e.g. position information units of at least two points from among position information units of four corners of, e.g. a start code or a stop code. Then, the slope sensing means senses a rotational angle of the bar code from the sensed position information units of the two points. On the basis of the obtained information, the reading means can extract the bar code information contained in the two-dimensional image of the bar code as a data sequence capable of being decoded.

According to a second aspect of the invention, there is provided a symbol information reading apparatus, comprising: imaging means for imaging a bar code including bars and spaces, and storing a two-dimensional image of the bar code in a frame memory; skip reading means for successively reading the information of the bar code from the frame memory in a predetermined direction at a predetermined reading interval; position sensing means for sensing a predetermined pattern determined in accordance with the type of the bar code by means of the skip reading means, and thereby sensing at least two points of the predetermined pattern; slope sensing means for sensing a slope of the bar code from the positions of the two points sensed by the position sensing means; reading means for successively reading information of the bar code from the two-dimensional image of the bar code stored in the frame memory, on the basis of the information obtained by the slope sensing means; and reading interval setting means for setting a first value and a second value alternately, as the predetermined reading interval of the skip reading means, each time the skip reading means reads the frame memory from the beginning to the end.

According to a third aspect of the invention, there is provided a symbol information reading apparatus, comprising: imaging means for obtaining a two-dimensional image of a bar code including bars and spaces; position sensing means for sensing at least two points of a predetermined pattern determined in accordance with the type of the bar code, on the basis of the two-dimensional image of the bar code obtained by the imaging means; slope sensing means for sensing a slope of the bar code from the positions of the two points sensed by the position sensing means; reading means for successively reading information of the bar code from the two-dimensional image of the bar code obtained by the imaging means, on the basis of the information obtained by the slope sensing means; width information conversion means for differentiating data of each line read by the reading means, and comparing the differentiated data with a threshold, thereby converting the differentiated data to width information of the bar and space; decoding means for decoding the information of the bar code to the original information, on the basis of the width information obtained by the width information conversion means; and threshold determining means for determining the threshold used by the width information conversion means, the threshold determining means including: temporary threshold sensing means for sensing a predetermined pattern determined in accordance with the type of the bar code on the basis of the two-dimensional image of the bar code obtained by the position sensing means, differentiating line data obtained at this time, and selecting, from among a plurality of peaks of differential intensity, a predetermined peak with a least distance between the bar and the space determined in accordance with the type of the bar code as a temporary threshold; and formal threshold determining means for judging whether or not the temporary threshold determined by the temporary threshold sensing means is within a predetermined threshold value range, and, if the temporary threshold is within the predetermined threshold value range, determining the temporary threshold as a formal threshold.

According to a fourth aspect of the invention, there is provided a symbol information reading apparatus, comprising: imaging means for imaging a bar code including bars and spaces, and storing a two-dimensional image of the bar code in a frame memory, the bar code including portions indicating the number of rows and the number of columns of the bar code; position sensing means for sensing at least two points of a predetermined pattern determined in accordance with the type of the bar code from the frame memory; slope sensing means for sensing a slope of the bar code from the positions of the two points sensed by the position sensing means; number-of-rows and number-of-columns sensing means for reading the information of the portions indicating the number or rows and the number of columns of the bar code from the two-dimensional image of the bar code stored in the frame memory, on the basis of the information obtained by the slope sensing means, and finding the number of rows and the number of columns of the bar code on the basis of the read information; optimal read line computing means for computing an optimal read line for reading one-line data on each row of the bar code, from the size of the bar code image on the frame memory based on the positions of the two points sensed by the position sensing means, the slope of the bar code sensed by the slope sensing means, and the number of rows of the bar code sensed by the number-of-rows and number-of-columns sensing means; and reading means for successively reading the information of the bar code from the two-dimensional image of the bar code stored in the frame memory, on the line computed by the optimal read line computing means.

According to a fifth aspect of the invention, there is provided a symbol information reading apparatus, comprising: imaging means for obtaining a two-dimensional image of a bar code including bars and spaces; position sensing means for sensing at least two points of a predetermined pattern determined in accordance with the type of the bar code, on the basis of the two-dimensional image of the bar code obtained by the imaging means; slope sensing means for sensing a slope of the bar code from the positions of the two points sensed by the position sensing means; reading means for successively reading information of the bar code from the two-dimensional image of the bar code obtained by the imaging means, on the basis of the information obtained by the slope sensing means; decoding means for decoding the information of the bar code obtained by the reading means and obtaining the original information; judging means for judging whether or not the original information can be obtained by the decoding means from the information mation of the bar code obtained by the reading means; and angle correction means for correcting the slope sensed by the slope sensing means by a predetermined degree when the judging means has judged that the angle is not possible, and enabling the reading means to successively read the information of the bar code on the basis of the corrected slope.

According to a sixth aspect of the invention, there is provided a symbol information reading apparatus, comprising: imaging means for obtaining a two-dimensional image of a bar code including bars and spaces; position sensing means for sensing at least two points of a predetermined pattern determined in accordance with the type of the bar code, on the basis of the two-dimensional image of the bar code obtained by the imaging means; slope sensing means for sensing a slope of the bar code from the positions of the two points sensed by the position sensing means; reading means for successively reading information of the bar code from the two-dimensional image of the bar code obtained by the imaging means, on the basis of the information obtained by the slope sensing means; width information conversion means for converting the data of each line read by the reading means to width information of the bar and space, the width information conversion means including differentiating means for differentiating the data of each line read by the reading means, peak position computing means for comparing each of differential intensities obtained by the differentiating means with a threshold, and fitting peak positions of the differential intensities exceeding said threshold and data items on both sides of each peak position by second-order curves, thereby obtaining peak positions of each second-order curve, and width information outputting means for outputting, as said width information, the difference between adjacent ones of the peak positions computed by the peak position computing means; and decoding means for effecting decoding to the original information on the basis of the width information obtained by the width information outputting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 11A to FIG. 11C are flowcharts for illustrating the scanning and sensing routines in FIG. 10;

FIG. 16A and FIG. 16B are flowcharts for illustrating the start code verify routine in FIG. 15;

FIG. 17A and FIG. 17B are flowcharts for illustrating the stop code verify routine in FIG. 15;

FIG. 19 shows the contents of a frame memory when an image of a bar code label of the PDF-417 code system has been taken in, for describing the threshold sensing line;

FIG. 20 is a differential waveform of a start code;

FIG. 22 shows the contents of a frame memory when an image of a bar code label of the PDF-417 code system has been taken in, for describing the method of determining the row/column number;

FIG. 24 shows the contents of a frame memory when an image of a bar code label of the PDF-417 code system has been taken in, for describing the method of calculating the start point column and end point column;

DETAILED DESCRIPTION OF THE PREFERRED EMBODIMENT

An embodiment of the present invention will now be described with reference to the accompanying drawings.

Figure 1:
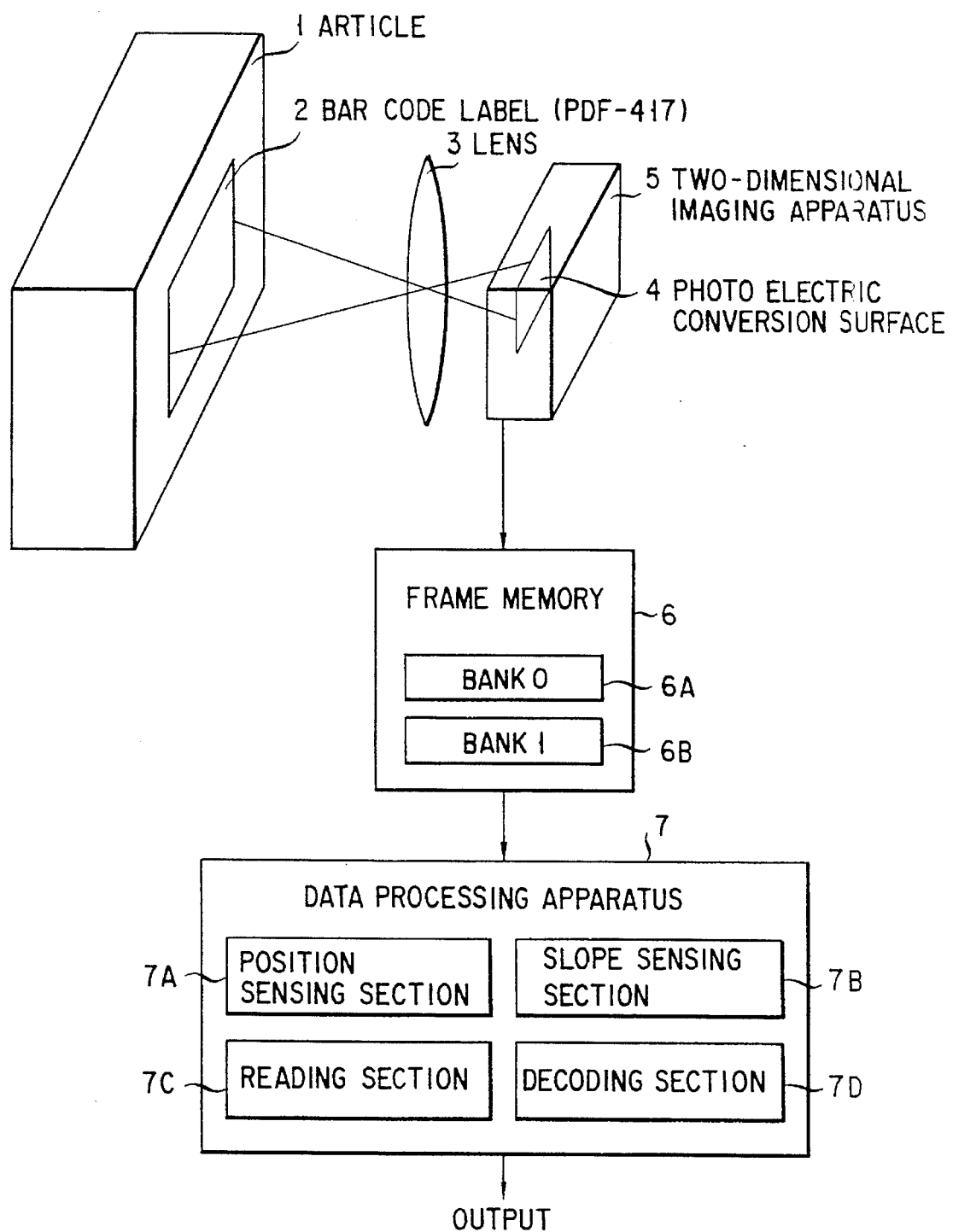
FIG. 1 shows the structure of a symbol information reading apparatus according to an embodiment of the present invention.

FIG. 1 shows the structure of a symbol information reading apparatus according to the embodiment. The symbol information reading apparatus comprises an image forming lens 3, a two-dimensional imaging apparatus 5, a frame memory 6, and a data processing apparatus 7. The data processing apparatus 7 comprises, e.g. a CPU and a memory, though not shown, and has the functions of a position sensing section 7A for estimating bar code position information, a slope sensing section 7B, a reading section 7C for reading bar code information, and a decoding section 7D. The memory in the data processing apparatus 7 comprises various registers for storing constants and variables, as will be described later.

An image of a stacked bar code label 2 printed on an article 1, e.g. a bar code label of PDF-417 format, is formed on a photoelectric conversion surface 4 mounted on the two-dimensional imaging apparatus 5 via the image-forming lens 3. Label information obtained by photoelectric conversion by the imaging apparatus 5 is taken in two images (Bank0 6A and Bank1 6B) in the frame memory 6 as image signals in a time-sequential manner.

Figure 2:
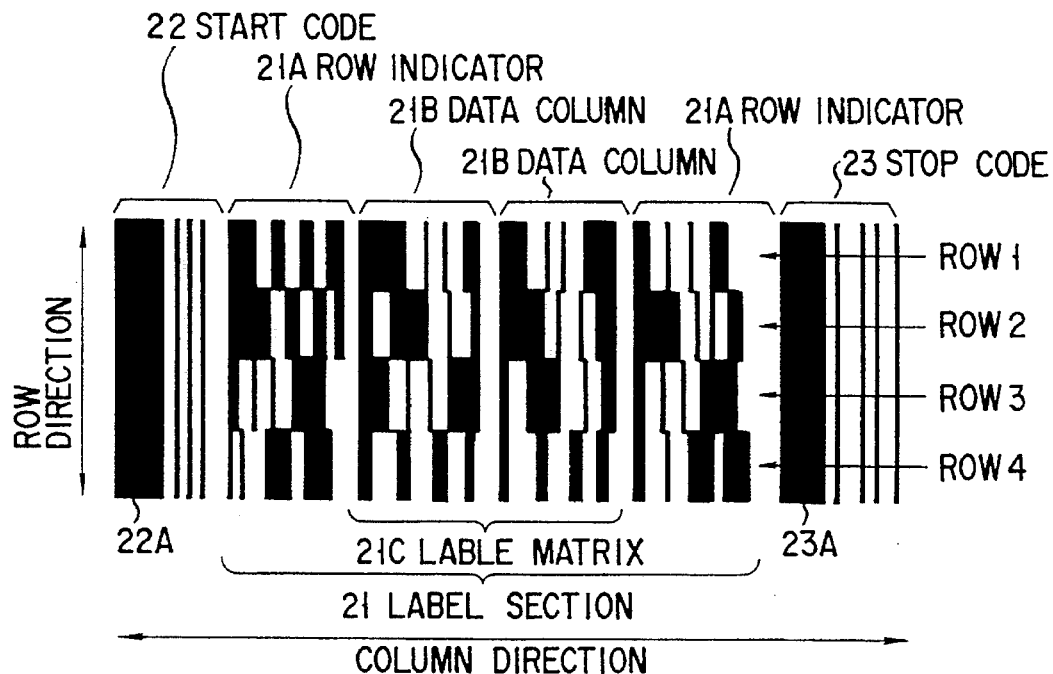
FIG. 2 shows a bar code label structure of the PDF-417 code system as an example of a stacked bar code.

FIG. 2 shows the label structure of the PDF-417 code system as an example of a two-dimensional stacked bar code. The bar code label 2 has a label section 21 which is an area of information components to be decoded, composed of bar code character groups consisting of bars and spaces, as well as a start code 22 and a stop code 23, serving as a start character and a stop character, placed before and after the label section. A single code is made up of four bars and four spaces except for the stop code 23. The start and stop codes 22 and 23 begin with thick bars 22A and 23A called big bars, respectively.

The label section 21 is composed of codes called row indicators 21A adjacent to the start code 22 and the stop code 23, and a label matrix 21C therebetween consisting of plural data columns 21B in which the actual data is written. In the row indicators 21A, the label size in the row and column directions, security level, and others are written. Consequently, by decoding the information in the row indicators, the information size of a label and others can be determined.

FIG. 2 shows a bar code label having a 4×2 label matrix.

Figure 3:
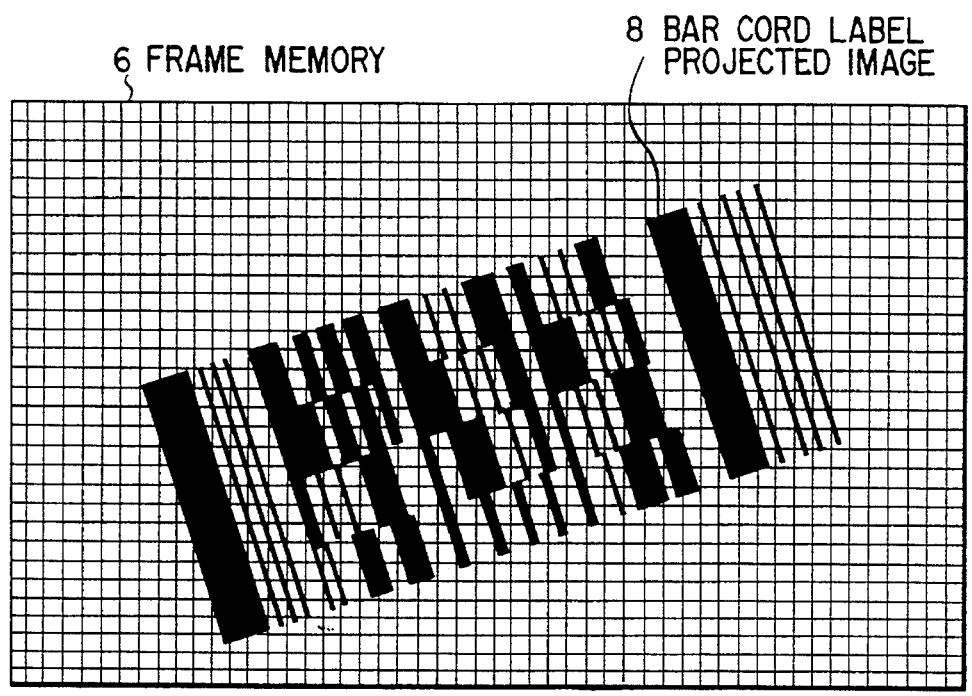
FIG. 3 is a pictorial view in which a bar code label image of the PDF-417 code system is hypothetically projected on the pixel array of a frame memory.

FIG. 3 is a pictorial view of a label image in the PDF-417 code system having a 4×1 label matrix hypothetically projected onto the pixel array of the frame memory 6. In FIG. 3, each mesh does not represent one pixel, but it has a size of (n×n) pixels.

The data processing apparatus 7, based on the algorithm explained below in detail, senses a label, reads and decodes label information, and supplies the decoded result to the host apparatus and other related devices (not shown).

Figure 4:
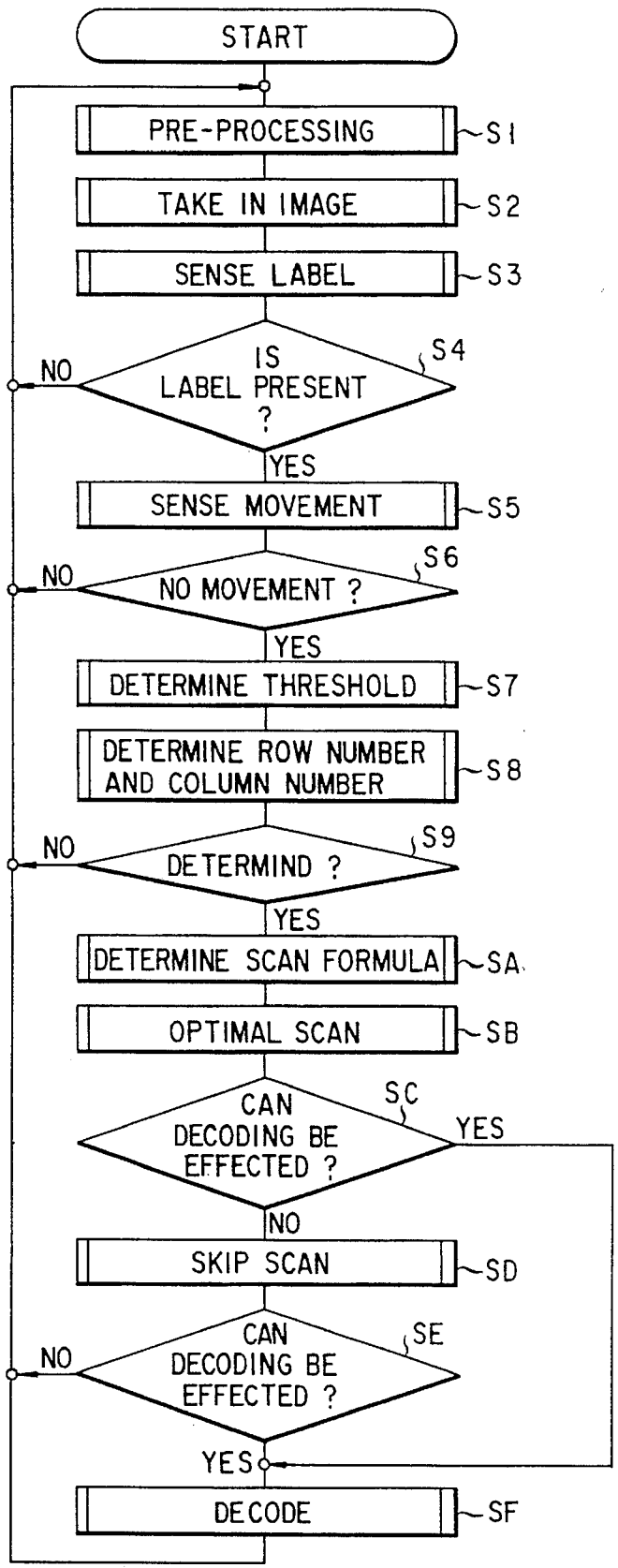
FIG. 4 is a flowchart for illustrating the general operation of the symbol information reading apparatus according to the embodiment of the invention.

FIG. 4 is a flowchart generally showing the contents of the algorithm executed by the data processing apparatus 7. In this description, flowcharts are prepared on the basis of programming language "C".

A pre-processing routine (described below in detail) is called (step S1) and a parameter of a variable INC0 is set (actually various parameters are initially set).

Then, an image take-in routine (described below in detail) is called (step S2) and image data is taken in two screens (Bank0 6A and Bank1 6B) in the frame memory 6 sequentially. In this context, the word "sequentially" means that image data of one screen is stored in Bank0 6A and then image data of one screen is stored in Bank1 6B. In this case, after a take-in command is issued, the latest frame data is taken in Bank0 6A. After the frame data has been taken in Bank0 6A, a take-in command is issued once again and the latest frame data is taken in Bank1 6B. Consequently, a time lag in image pickup is preset between the data items of the two screens (the time lag is expressed by (the time needed to store data in Bank0 6A)+(0 to 1/30 seconds)).

Subsequently, a label sense routine (described below in detail) is called (step S3). Using Bank0 6A of the taken-in data, it is determined whether a label is present or not. If the label is present, label information is sensed.

The result of the label sensing process in step S3 is judged (step S4). If there is no label, the control routine is returned to step S1 and the pre-processing routine is called.

On the other hand, if the label is present, a movement sense routine (described below in detail) is called (step S5), thereby estimating the influence of movement in the Bank1 6B of the image data taken in step S2. In this context, the word "movement" means a movement of an image which frequently occurs when an object with the bar code label 2 is placed above the reading apparatus.

The result of the movement sensing in step S5 is judged (step S6). If a movement has not occurred, the control routine is returned to step S1, and the pre-processing routine is called.

If a movement is sensed, a threshold determining routine (described below in detail) is called (step S7), thereby finding a threshold (variable THRESHOLD) for use in a process of extracting inter-edge width information from line data to be processed, in an optimal scan routine in step SB (described later) and a skip scan routine in step SD (described later).

A row number/column number determining routine is called (step S8), and a row indicator 21A of the label 2 is read to determine a label size, etc.

It is judged whether the label size, etc. have been determined in the determining routine of step S8 (step S9). If the label size, etc. have not been determined, the control routine is returned to step S1 and the pre-processing routine is called.

On the other hand, when the label size, etc. have been determined, a scan formula determining routine (described below in detail) is called (step SA), and various variables for scanning the entire surface of the label 2 are defined.

Then, an optimal scan routine (described below in detail) is called (step SB). Using the variables defined in step SA, the entire surface of the label is scanned with an optimal scan distance and label information is read. In this context, the word "optimal scan" means a scanning operation with an optical scan distance for obtaining all label information with a least amount of calculation, when the label has no defect.

It is judged whether the decoding can be effected on the basis of the information read by the optical scan in step SB (step SC). When the decoding can be effected, a decoding process in step SF is performed.

If the decoding cannot be effected, a skip scan routine (described below in detail) is called (step SD). In the skip scan routine, the label is entirely scanned by using the variables defined in step SA and the label information is read.

It is judged whether the decoding can be effected on the basis of the information read in step SD (step SE). If the decoding can be effected, a decoding process in step SF is performed.

If the decoding cannot be effected, the control routine is returned to step S1 and the pre-processing routine is called.

In the decoding process in step SF, the information read in the optimal scan routine in step SB or in the skip scan routine in step SD is decoded, and the decoded result is output to the host apparatus, etc. (not shown).

The above-mentioned various routines will now described in detail.

Figure 5:
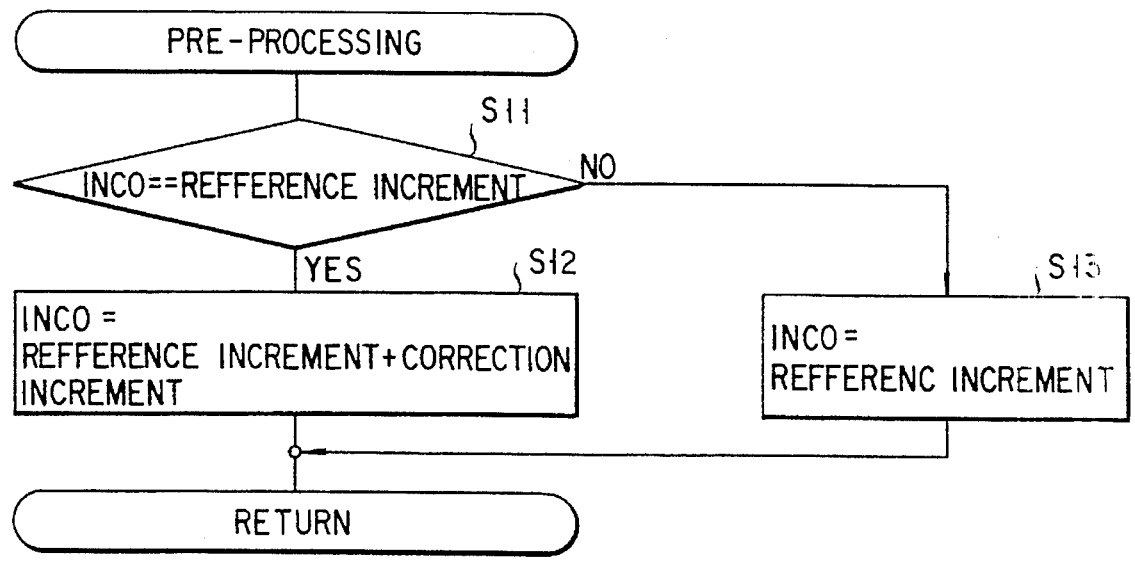
FIG. 5 is a flowchart for illustrating the pre-processing routine in FIG. 4.

Referring to the flowchart of FIG. 5, the pre-processing routine called in step S1 will now be described.

It is judged whether the value of variable INC0 is equal to a reference increment which represents a predetermined sensing interval (step S11). If the value is equal, the variable INC0 is reset to a value obtained by adding a correction increment to the reference increment (step S12). If the value is not equal, the value is reset to the reference increment (step S13). Thereby, the value of the variable INC0 is varied when the control routine comes to the pre-processing routine in the large loop of FIG. 4 at the odd-number of times and even-number of times. In FIG. 5, "==" represents "equal", and "=" represents "substitution." The value of variable INC0 represents the sensing interval at the time the label is not sensed.

Figure 6:
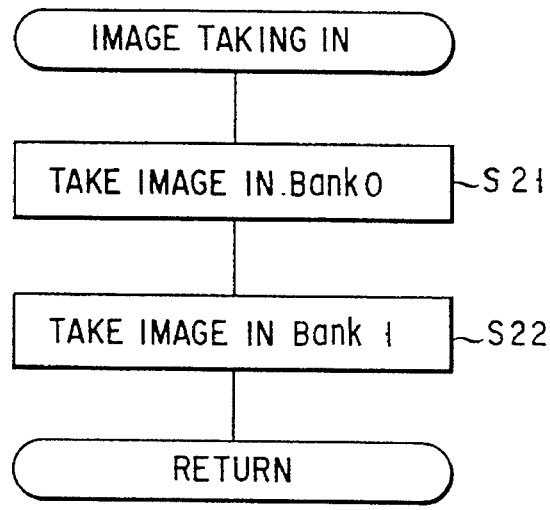
FIG. 6 is a flowchart for illustrating the image take-in routine in FIG. 4.

Referring to the flowchart of FIG. 6, the image taking-in routine called in step S2 will be explained.

Image data is taken in Bank0 6A of the frame memory 6 from the two-dimensional imaging apparatus 5 (step S21). Then, the image data is taken in Bank1 6B of the frame memory 6 from the two-dimensional imaging apparatus 5 (step S22). This allows image data of two screens to be taken in successively.

Figure 7:
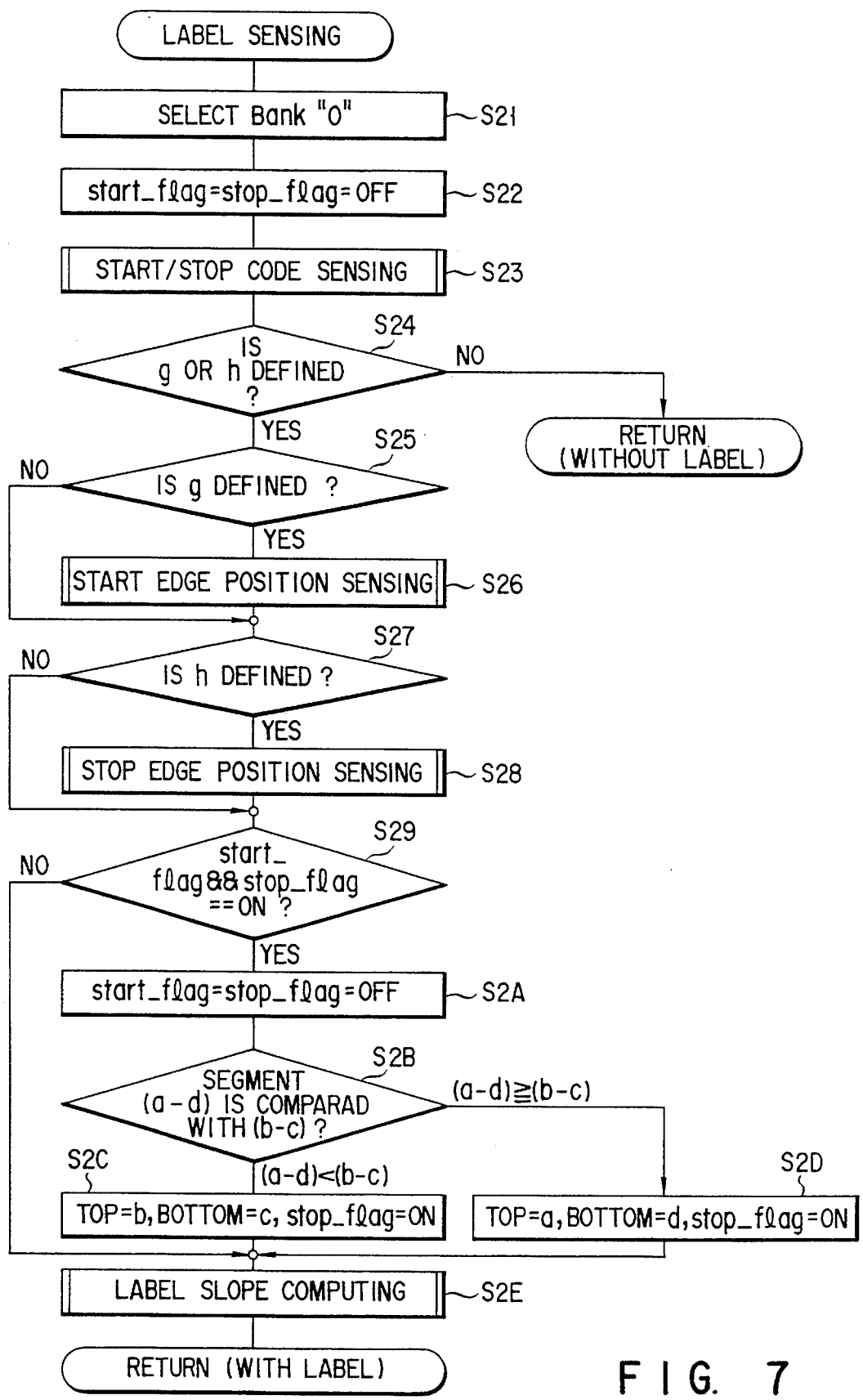
FIG. 7 is a flowchart for illustrating the label sensing routine in FIG. 4.
Figure 8:
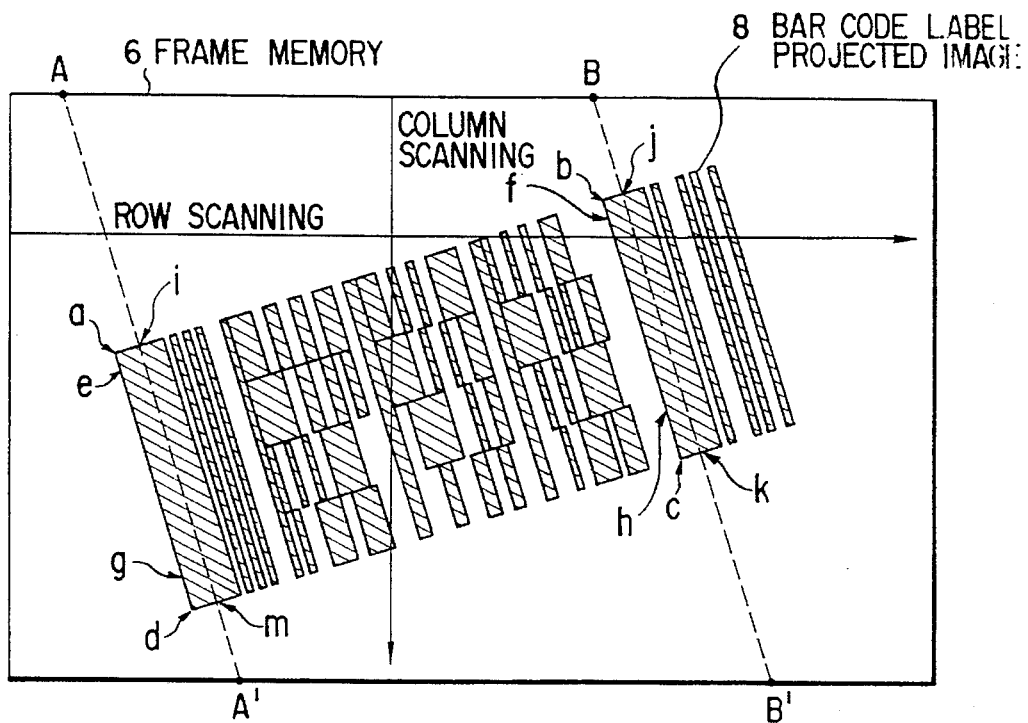
FIG. 8 shows the contents of a frame memory when an image of a bar code label of the PDF-417 code system has been taken in, for describing the label sensing method.

Next, the label sensing routine called in step S3 will be described, referring to the flowchart of FIG. 7 and the projected label image of FIG. 8. The label sensing routine includes two types of label sensing processes: the sensing of the presence/absence of a label and the sensing of label position information, that is, the determining of an extracting range (variables TOP and BOTTOM) for extracting the image data from the frame memory 6 so as to be parallel to the label as well as the slope of the label (variable SLOPE). Here, the value of variable TOP indicates the top coordinates of the label and the contents of variable BOTTOM indicate the bottom coordinates of the label. The contents of variable SLOPE represent the slope of the label.

In the label sensing routine, the image information in Bank0 6A of the frame memory 6 is selected as the image information to be processed (step S31). Then, the label sensing flag is initialized (step S32). The label sensing flag is composed of a start sensing flag "start_flag" and a stop sensing flag "stop_flag." These label sensing flags are used to indicate which of the start code 22 and the stop code 23 should be selected and processed in a process explained later. This is because when both of the start code 22 and the stop code 23 are sensed, the more reliable one must be selected.

Next, a start/stop code sensing routine explained later is called (step S33) to sense whether or not the image data stored in Bank0 6A of the frame memory 6 contains a start and/or a stop code. That is, coordinates e, f, g, and h in FIG. 8 are sensed (all the four coordinate variables are not necessarily sensed; for example, in the case of FIG. 9, coordinate variables f and h may not be obtained). If a start and a stop code are sensed and determined by this routine, coordinate variable g on the frame memory 6 in FIG. 8 is defined for the start code 22, and coordinate variable h is defined for the stop code 23. Here, coordinate variable e indicates the coordinates at which the start code 22 is first found, f the coordinates at which the stop code 23 is first found, g the coordinates at which the start code 22 is last found, and h the coordinates at which the stop code 23 is last found.

Then, it is judge whether or not one of the coordinates g and h is defined (step S34), and if not, it is determined that there is no label and control escapes from this processing. That is, control returns with the information containing no label. Although in this specification, the flowchart is drawn as shown in the figure because the flow is written according to the notational conventions of the C language, the conventions of FORTRAN would produce a different flowchart in which return is made after a no-label flag is set up.

In the way described above, whether a label is present or not is sensed.

Next, performed is the sensing of label position information, that is, the computing of an extracting range (variables TOP and BOTTOM) for extracting the image data from the frame memory 6 so as to be parallel to the label as well as the slope of the label (variable SLOPE).

Specifically, in step S34, if it is judged that one of coordinates g and h is defined, and then it is judged whether or not coordinate variable g is defined (step S35). If not, control proceeds to step S37. If coordinate variable g is defined, a start edge position sensing routine explained later is called (step S36) to sense the start edge position. The start edge sensing defines coordinate variables i and m as shown in FIG. 8 on the basis of coordinate variables e and g (when coordinate variable g has been defined, then naturally coordinate variable e has also been defined), and further coordinate variables a and d. In addition, "start_flag" is set and coordinate variables TOP and BOTTOM are defined. Here, each of coordinate variables a and d indicates one of the coordinates of the four corners of the label.

Next, it is judged whether or not coordinate variable h is defined (step S37), and if not, control goes to step S39. If coordinate variable h is defined, a stop edge position sensing routine explained later is called (step S38) to sense the stop edge position. The stop edge sensing defines coordinate variables j and k as shown in FIG. 8 on the basis of coordinate variables f and h (when coordinate variable h has been defined, then coordinate variable f has also been defined), and further coordinate variables b and c. Additionally, stop_flag is set and coordinate variables TOP and BOTTOM are defined. Here, each of coordinate variables b and c indicates one of the coordinates of the four corners of the label.

Next, it is judged whether or not both of start_flag and stop_flag are on (step S39). If none of them are on, control proceeds to step S3E. Here, the symbol "&&" means logical product.

If both flags are on, both of start_flag and stop_flag are reset once (step S3A). Then, segment (a-d) is compared with segment (c-d) (step S3B), and either the start code 22 or the stop code 23 whose segment is longer than the other is selected as that to be processed. The longer one is selected as a reference in processing since the main reason why one code becomes shorter than the other in normal operation is that the former sometimes sticks out from the screen.

If segment (a-d) is shorter than segment (b-c), the value of coordinate variable b is substituted into coordinate variable TOP and the value of coordinate variable c is substituted into coordinate variable BOTTOM to define data to determine an extracting range of label information, and further stop_flag is selected and turned on (step S3C).

Conversely, if segment (a-d) is longer than segment (b-c), the value of coordinate variable a is substituted into coordinate variable TOP and the value of coordinate variable d is substituted into coordinate variable BOTTOM to define data to determine an extracting range of label information, and further start_flag is selected and turned on (step S3D).

Then, the label slope computing routine is called (step S3E) to obtain the label slope (variable SLOPE) from those coordinate variables TOP and BOTTOM. Control then returns together with the obtained variable and the label presence information.

Figure 10:
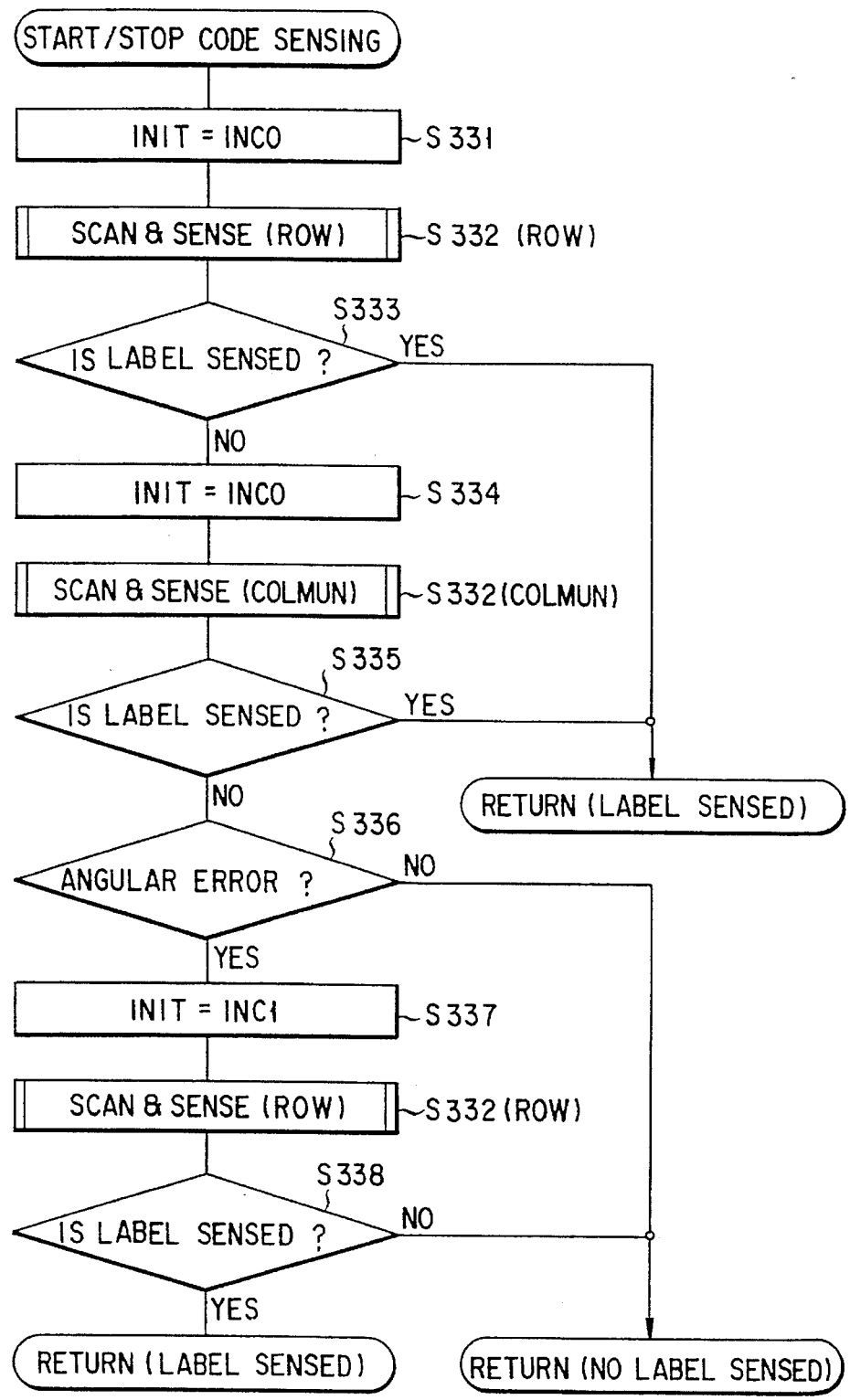
FIG. 10 is a flowchart for illustrating the start/stop code sensing routine in FIG. 7.

Next, the start/stop code sensing routine called in step S33 in the label sensing routine will now be described with reference to the flowchart of FIG. 10. The start/stop code sensing routine senses at least one set of coordinate variables e and g or f and h as described above.

First, the value of sensing interval variable INC0 during sensing no label is substituted into label sensing interval variable INIT (step S331). Next, a scanning & sensing (row) routine explained later is called (step S332) to scan the image data in Bank0 6A in the frame memory 6 in the row direction to sense start/stop codes. Here, scanning in the row direction means scanning in the longitudinal direction of the frame memory 6 as shown by row scan in FIG. 8.

From the result of the scanning & sensing (row) routine, it is judge whether the start code 22 or the stop code 23 is sensed, or the label is sensed or not (step S333). If a label is sensed, control returns with the label presence information.

On the other hand, when no label is sensed, the value of label sensing interval variable INC0 during sensing no label is substituted into label sensing interval variable INIT (step S334). After this, the scanning & sensing (row) routine is called (step S332) to scan the image data in Bank0 6A in the frame memory 6 in the column direction to sense start/stop codes. Here, scanning in the column direction means scanning in the lateral direction of the frame memory 6 as shown by the column scan in FIG. 8.

From the result of the scanning & sensing (column) routine, it is judged whether the start code 22 or the stop code 23 is sensed, or the label is sensed or not (step S335). If a label is sensed, control returns with the label presence information.

When no label is sensed this time either, however, it is determined whether the cause comes from angular errors (step S336). The judgment of angular errors in the label is made by referring to the return value of the scanning & sensing routine called at step S332. Specifically, the scanning & sensing routine always checks to see if an angular error has occurred. If an error has occurred, it sets up an angular error flag and a label unsensed flag in the return value, terminates the processing there, and returns control. In the judgment of angular errors, the subsequent processing is carried out again only in the row direction. Thus, it is judged whether no-label result is obtained because of angular errors or because no label has been sensed, by judging the return value of scanning in the column direction in step S336.

When it is judged that it is not due to angular errors in step S336, control returns with information on sensing no label.

On the other hand, when it is judged that it is due to angular errors, then label sensing interval INC1 during label sensing is substituted into label sensing interval variable INIT (step S337). For the size of sensing interval variable INC0 and INC1, it is desirable that the least common multiple of both of them should be basically exceed the screen range: for example, INC0= 23 and INC1=17.

After that, the scanning & sensing (row) routine is called again (step S332) to scan the image data in Bank0 6A of the frame memory 6 in the row direction to sense the start/stop codes.

Then, it is judged whether or not the start/stop codes (or a label) are sensed (step S338). If it is found that they are sensed, control returns with information of sensing a label, and if not, control returns with information on sensing no label.

In this way, in the start/stop code sensing routine, sensing is first done in the row direction. If this scanning has failed to sense any label, then scanning is done in the column direction. If the scanning has further failed to sense any label, then it is judged whether it is due to angular errors (that is, the label is inclined too much). If it is found that it is due to an angular error, the label sensing interval is changed and scanning is done again in the row direction. Even if this fails to sense any label, it is determined that there is no label.

The reason why scanning is done only in the row direction in the case of angular errors is that the bar code label 2 is generally placed so that row scanning may find the label, that is, the column direction may agree with the longitudinal (lateral) direction of the frame memory 6 and that by making use of this human characteristics, column scanning can be omitted. Column scanning may, of course, be done, in which case, however, the execution speed decreases.

Figure 11B:
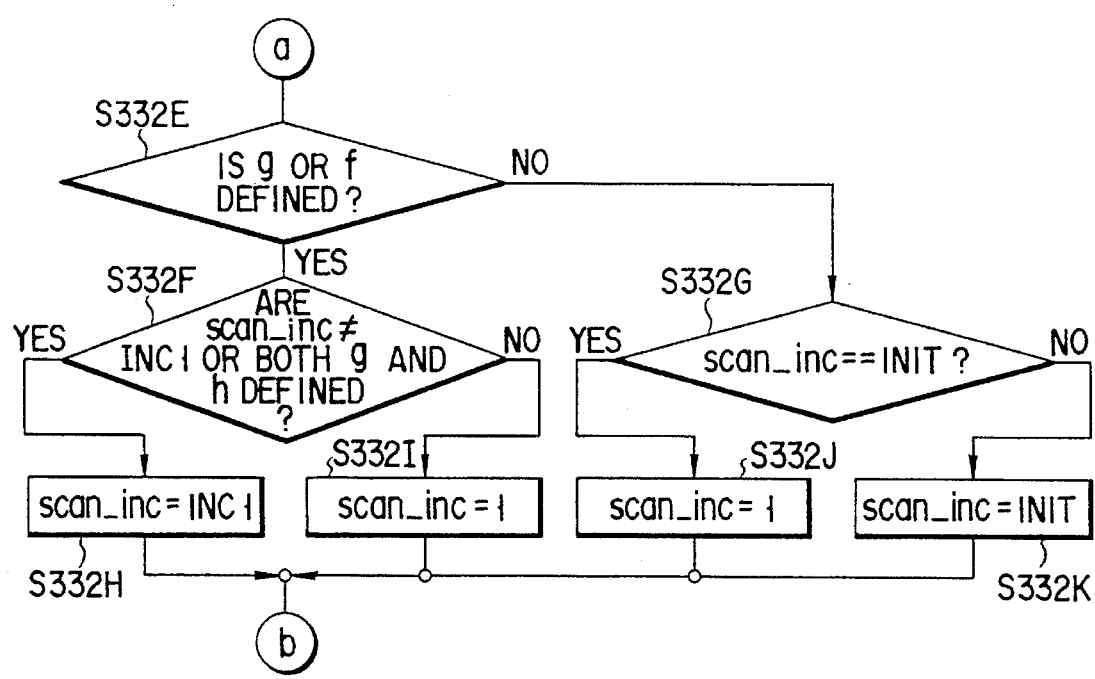
Figure 11C:
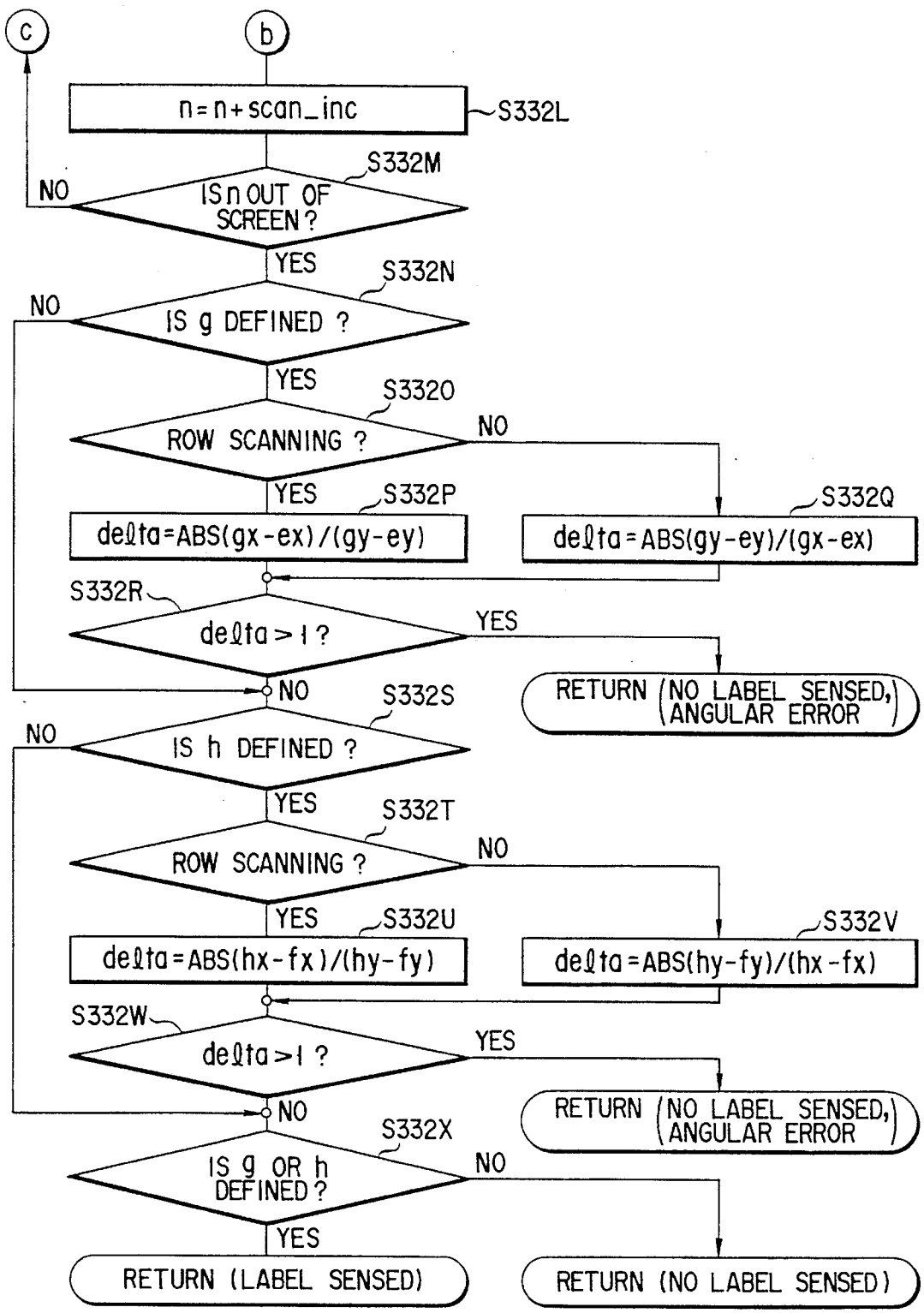

Referring to a series of flowcharts shown in FIGS. 11A to 11C, the scanning & sensing routine called in step S332 will be described. This routine scans the image data in Bank0 6A in the row or column direction at sensing intervals (varied under specified conditions) to determine at least one set of coordinate variables e and g and coordinate variables f and h. The direction in which scanning is done is determined when the routine is called. When at least one set of coordinate variables e and g and coordinate variables f and h has been determined and there has been no angular error at that time, it is judged that a label has been sensed and control returns to a higher-level routine. When neither one set of coordinate variables e and g nor one set of coordinate variables f and h could be sensed, it is judged that there has been no label, and control returns to a higher-level routine. Even if a label has been sensed, when the label angle computed from the coordinate values shows that the label inclines more than 45° toward the scanning direction, it is judged that there has been no label and an angular error has occurred, and control returns to a higher-level routine.

Specifically, parameter scan_inc is initially set in sensing interval variable INIT (step S3321), and parameter n is initially set in the parameter scan_inc (step S3322). Here, parameter scan_inc indicates the label sensing (scanning) interval used in this routine, and parameter n shows the position of a line to be sensed (scanned).

After this initial setting, it is judged whether it is row scanning or column scanning (step S3323). If it is row scanning, the image data on the nth line is taken in (step S3324), and if it is column scanning, the image data on the nth column is taken in (step S3325).

Next, it is judged whether or not the image data taken in contains the start code 22 (step S3326). If not, control goes to step S332A. If the start code 22 exists, it is judged whether or not the start code 22 has been sensed for the first time (step S3327). If it is sensed for the first time, the sensed coordinates are stored in coordinate variable e (step S3328). If not, the sensed coordinates are stored in coordinate variable g (step S3329). The judgment of whether or not it is sensed for the first time is made based on whether a value is stored in coordinate variable e.

Similarly, it is judged whether or not the image data taken in contains the stop code 23 (step S332A). If not, control goes to step S332E. If the stop code 23 exists, it is judged whether or not the stop code 23 has been sensed for the first time (step S332B). If it is sensed for the first time, the sensed coordinates are stored in coordinate variable f (step S332C). If not, the coordinates are stored in coordinate variable h (step S332D). The judgment of whether or not it is sensed for the first time is made based on whether a value is stored in coordinate variable f.

Next, it is judged whether coordinate variable e or f has been defined (stored) (step S332E). If coordinate variable e of f has been defined, control goes to step S332F. If not, control goes to step S332G. In step S332F, it is judged whether the scan interval scan_inc is not the sensing interval variable INC1 at the time of label sensing, or both coordinate variables g and h have been defined. If scan_inc is not INC1 or both g and h have been defined, the scan interval scan_inc is set to the variable INC1 (step S332H), and, if not, the scan_inc is set to 1 (step S332I). If "NO" in step S332E, it is judged whether the scan interval scan_inc is the sensing interval variable INIT (step S3332G). If "YES" in step S332G, the scan interval scan_inc is set to 1 (step S332J). If "NO" in step S332G, scan_inc is set to INIT (step S332K).

The steps from S332E to S332K relate to the process of varying the data take-in interval. While the coordinate variables e and f are not defined, the scan interval scan_inc takes the value of the sensing interval variable INIT and "1" alternately. When the coordinate variables e and f have been defined, the scan interval scan_inc takes the value of the sensing interval variable INC1 at the time of label sensing and "1" alternately until both g and h are defined. If all the coordinate variables e, f, g and h have been defined, the scan interval scan_inc is set to the variable INC1.

More specifically, from the beginning of the sensing process to the completion of sensing of one of the start/stop codes, the scan interval takes the value of INIT (=INC0, e.g. 23) and 1 alternately. From the completion of sensing of one of the start/stop codes to the end of the screen, the scan interval takes the value of INC1 (e.g. 17) and 1 alternately. The reason why the sensing line interval is varied in this manner is as follows. If the sensing line interval is made constant, there may be a label angle at which sensing is disabled, which angle is determined by a minimum line width of the label, an imaging magnification, and a two-dimensional imaging element pitch. In order to avoid the presence of such a label angle, the interval is varied from the time the sensing process begins to the time one of the start/stop codes is sensed. In this case, too, it is possible, depending on conditions, that the label is not sensed ("oversight"), although the label is actually imaged. A first "oversight" may be acceptable, but a second "oversight" is prevented by varying the increment INIT (=INC0).

The scan interval scan_inc is set to INC1 when the coordinate variables e, f, g and h have been defined, because once all the coordinates are computed, there is no need to compute new values of g and h and it is more important to quickly complete this processing. If the increment is set to 1 after all the coordinates have been computed, new values of g and h are normally computed successively.

Next, the value of parameter n is increased by the value of scan_inc to update n (step S332L) to determine the number of rows or columns to be taken in the next time. Since the length and width of the frame memory 6 are known, it is judged from these factors whether the updated n is outside the screen or not (step S332M). If it is within the screen, control is returned to step S3323.

If it is outside the screen or the scanning is completed, then it is judged whether or not coordinate variable g has been defined (step S332N). If not, control is returned to step S332S.

If the coordinate variable g has been defined, then it is judged whether row scanning or column scanning is performed (step S332O).

If row scanning is performed, the difference between the value of x-coordinate of coordinate value g and the value of x-coordinate of coordinate variable e is divided by the difference between the value of y-coordinate of coordinate variable g and the value of y-coordinate of coordinate variable e, and the absolute value of the result is computed (represented by "ABS" in the figure). The absolute value is substituted into variable "delta" that shows the value of the slope (step S332P).

If column scanning is performed, the difference between the value of y-coordinate of coordinate variable g and the value of y-coordinate of coordinate variable e is divided by the difference between the value of x-coordinate of coordinate variable g and the value of x-coordinate of coordinate variable e, and the absolute value of the result is computed. The absolute value is substituted into variable "delta" (step S332Q).

Then, by judging whether or not the absolute value "delta" of the slope obtained is larger than 1 (step S332R), it is judged whether an angular error has occurred. If an angular error has occurred, control returns with information on sensing no label and on angular errors.

If an angular error has not occurred, or if it has been judged in step S332N that coordinate variable g has not been defined, then it is judged whether or not coordinate variable h has been defined (step S332S). If not, control is returned to step S332X.

If coordinate variable h has been defined, then it is judged whether row scanning or column scanning is performed (step S332T).

If row scanning is performed, the difference between the value of x-coordinate of coordinate variable h and the value of x-coordinate of coordinate variable f is divided by the difference between the value of y-coordinate of coordinate variable h and the value of y-coordinate of coordinate variable f, and the absolute value of the result is computed. The absolute value is substituted into the absolute value of the slope "delta" (step S332U).

If column scanning is performed, the difference between the value of y-coordinate of coordinate variable h and the value of y-coordinate of coordinate variable f is divided by the difference between the value of x-coordinate of coordinate variable h and the value of x-coordinate of coordinate variable f, and the absolute value of the result is computed. The absolute value is substituted into "delta" (step S332V).

Then, by judging whether or not the absolute value "delta" of the slope obtained is greater than 1 (step S332W), it is judged whether an angular error has occurred. If an angular error has occurred, control returns with information on sensing no label and on angular errors.

If no angular error has occurred or if it has been judged in step S332S that coordinate variable h has not been defined, then it is judged whether or not coordinate variable g or h has been defined (step S332X). If it has been defined, control returns with information sensing a label, and if not, control returns with information on sensing no label.

In this way, in steps S332N through S332Q or steps S332S through S332V, the slope of the entire label is obtained by computing the slope of the start/stop codes. In step S332R or S332W, it is judged whether or not the absolute value "delta" of the slope exceeds 1. If it exceeds 1, it is judged that an angular error has occurred and no label is sensed, and control is returned. If the absolute value "delta" of the slope has not exceeded 1, it is judged in step S332X whether or not coordinate variable g or h has been defined. If it is defined, it is judged that a label is sensed and control is returned. If not, it is judged that no label is sensed and control is returned.

The reason why the judgment of angular errors in steps S332R and S332W is made is that there is a possibility, though very low, that oversight takes place in the extracting direction in which an error should be found and the error is found in another direction. In this case, since an error will occur in a subsequent process, such sensing should be prevented. Further, the reason why a reference of angular is 1 is that "delta" becomes 1 at a label rotational angle of 45°.

Figure 12:
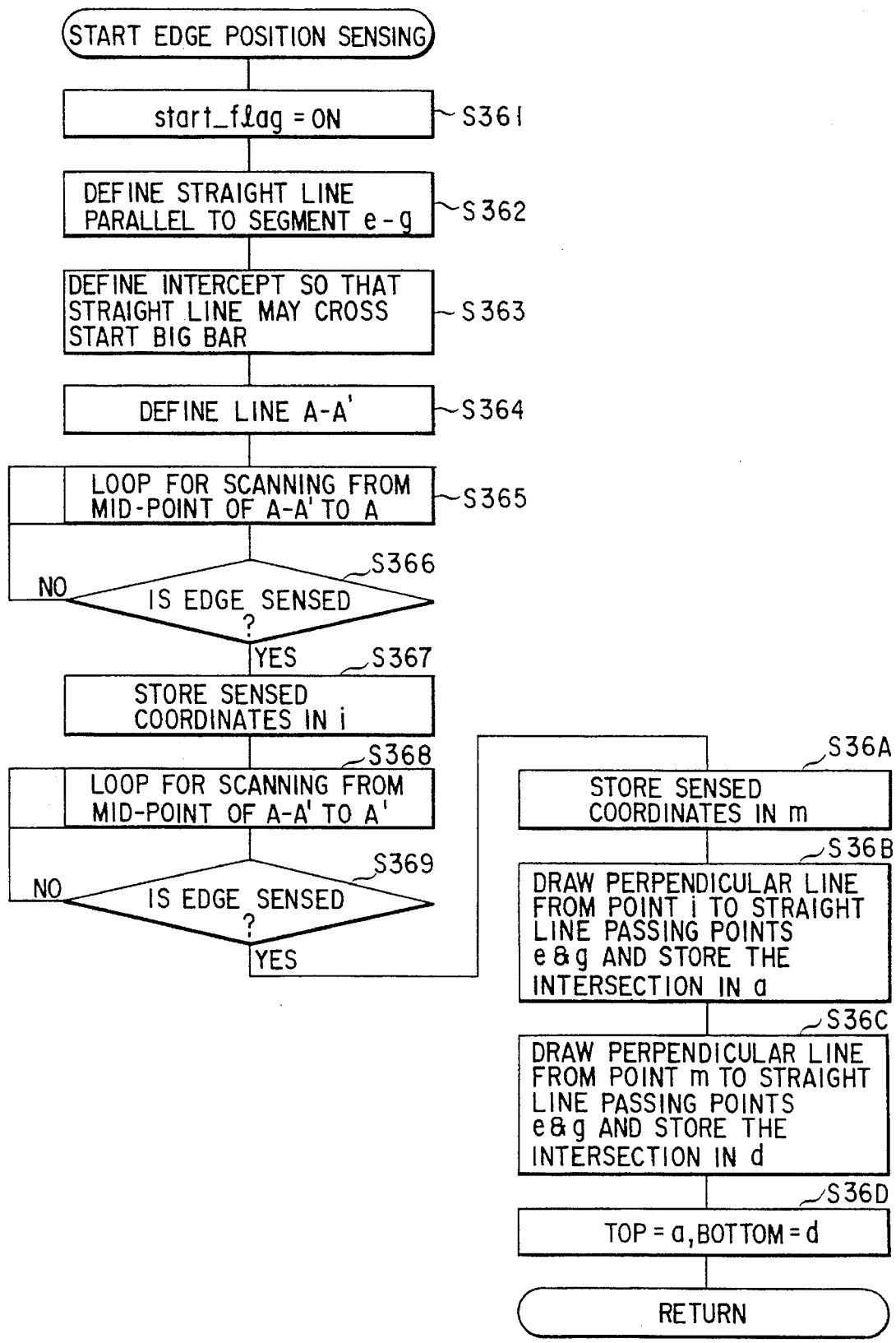
FIG. 12 is a flowchart for illustrating the start edge position sensing routine in FIG. 7.

Next, the start edge position sensing routine called in step S36 in the label sensing routine will now be described by referring to the flowchart of FIG. 12.

First, the start sensing flag "start_flag" is turned on (step S361) and an equation for a straight line parallel to segment e-g is defined: for example, y=ax+b is defined as an equation for segment e-g (step S362). Next, an intercept b is defined so that the straight line may cross the start big bar 22A (step S363). The start code 22 is composed of, for example, the start big bar 22A consisting of eight bars, three pairs of white bars and black bars, and three white bars, that is, a total of 17 bars. The result of imaging this is assumed to be N pixels. It is known that a straight line expressed by y=ax+b moves parallel as intercept b is varied. Thus, to obtain a straight line crossing the big bar 22A, intercept b must be such that the segment e-g is moved to the left as much as {(17−8/2)/17}×N pixels.

After a line crossing the start big bar 22A has been obtained, the intersections of the line and the equation defining the screen are defined as A and A' (see FIG. 8) (step S364).

Then, the image information is examined sequentially, starting at the mid-point of line A-A' to point A (step S365) to check to see if there is an edge (step S366). This check can be made by, for example, comparison of intensity to examine the change of luminance, differential, or quadratic differential. When an edge is sensed this way, the sensed coordinates are stored in coordinate variable i (step S367). That is, the sensed coordinates are defined as point i.

Next, the image information is examined sequentially, starting this time at the mid-point of line A-A' to point A' (step S368) to check to see if there is an edge (step S369). When an edge is sensed this way, the sensed coordinates are stored in coordinate variable m (step S36A). That is, the sensed coordinates are defined as point m.

Then, a perpendicular line is drawn from point i indicated by coordinate variable i to the line passing points e and g indicated by coordinate variables e and g, and the coordinates of the intersection are stored in coordinate variable a (step S36B). That is, an equation for a straight line meeting at right angles with line A-A' passing point i is determined, and the intersection of this line and the line passing points e and g is obtained. The intersection is then defined as point a.

Similarly, a perpendicular line is drawn from point m indicated by coordinate variable m to the line passing points e and g indicated by coordinate variables e and g, and the coordinates of the intersection are stored in coordinate variable d (step S36C). That is, an equation for a straight line meeting at right angles with line A-A' passing point m is determined, and the intersection of this line and the line passing points e and g is obtained. The intersection is then defined as point d.

After the value of coordinate variable a thus obtained is stored in coordinate variable TOP and the value of coordinate variable d is stored in coordinate variable BOTTOM (step S36D), control is returned to a higher-level routine.

Figure 13:
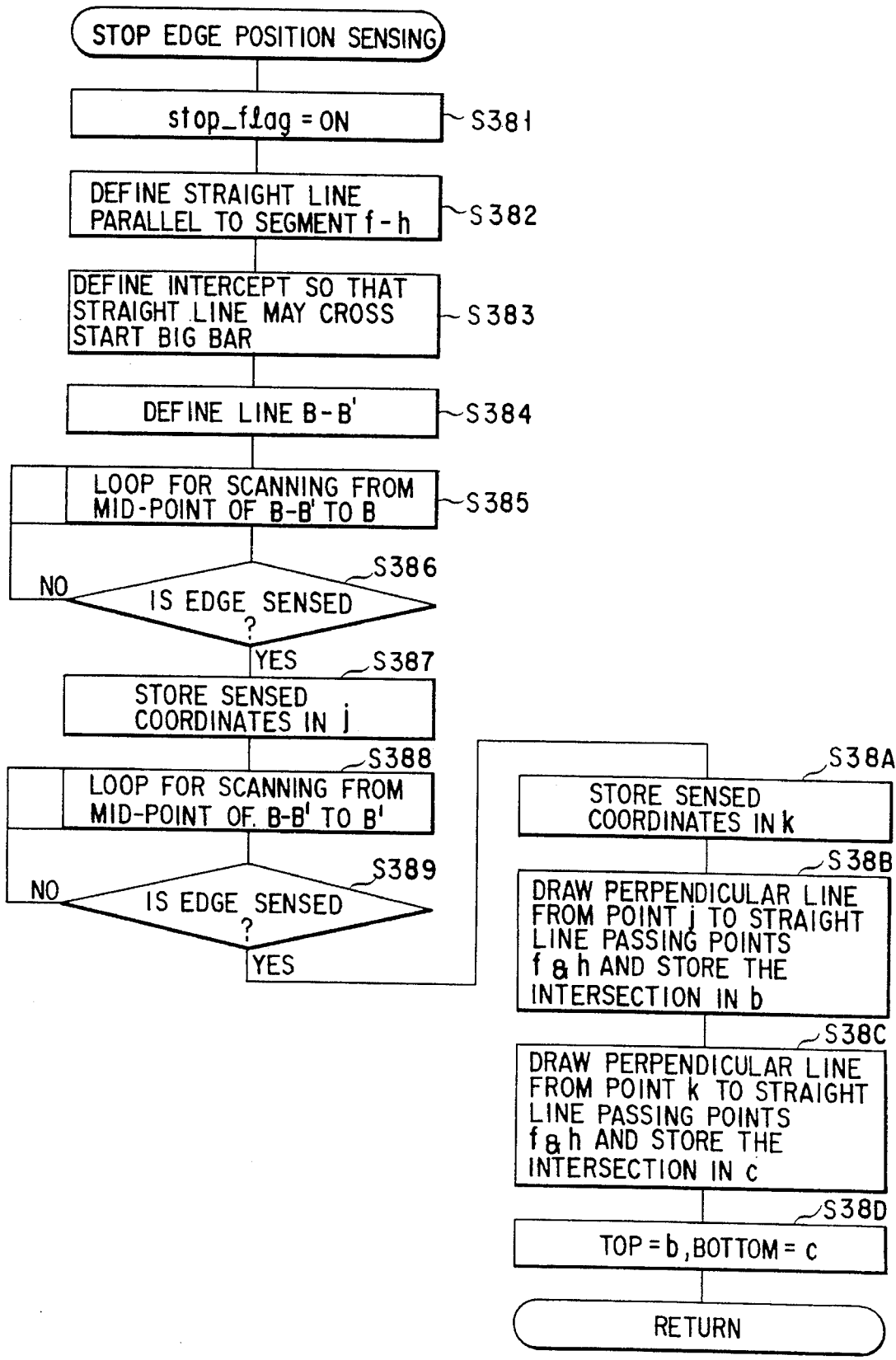
FIG. 13 is a flowchart for illustrating the stop edge position sensing routine in FIG. 7.

The stop edge position sensing routine called in step S38 in the label sensing routine functions in almost the same manner as the start edge position sensing routine. FIG. 13 is a flowchart for the stop edge position sensing routine.

First, the stop sensing flag "stop_flag" is turned on (step S381) and an equation for a straight line parallel to segment f-h is defined: for example, y= ax+b is defined as an equation for segment f-h (step S382). Next, an intercept b is defined so that the straight line may cross the stop big bar 23A (step S383). After a line crossing the stop big bar 23A has been obtained, the intersections of the line and the equation defining the screen are defined as B and B' (see FIG. 8) (step S384).

Then, the image information is examined sequentially, starting at the mid-point of line B-B' to point B (step S385) to check to see if there is an edge (step S386). When an edge is sensed this way, the sensed coordinates are stored in coordinate variable j (step S387). That is, the sensed coordinates are defined as point j.

Next, the image information is examined sequentially, starting this time at the mid-point of line B-B' to point B' (step S388) to check to see if there is an edge (step S389). When an edge is sensed this way, the sensed coordinates are stored in coordinate variable k (step S38A). That is, thee sensed coordinates are defined as point k.

Then, a perpendicular line is drawn from point j indicated by coordinate variable j to the line passing points f and h indicated by coordinate variables f and h, and the coordinates of the intersection are stored in coordinate variable b (step S38B). That is, an equation for a straight line meeting at right angles with line B-B' passing point j is determined, and the intersection of this line and the line passing points f and h is obtained. The intersection is then defined as point b.

Similarly, a perpendicular line is drawn from point k indicated by coordinate variable k to the line passing points f and h indicated by coordinate variables f and h, and the coordinates of the intersection are stored in coordinate variable c (step S38C). That is, an equation for a straight line meeting at right angles with line B-B' passing point k is determined, and the intersection of this line and the line passing points f and h. The intersection is then defined as point c.

After the value of coordinate variable b thus obtained is stored in coordinate variable TOP and the value of coordinate variable c is stored in coordinate variable BOTTOM (step S38D), control is returned to a higher-level routine.

Figure 9:
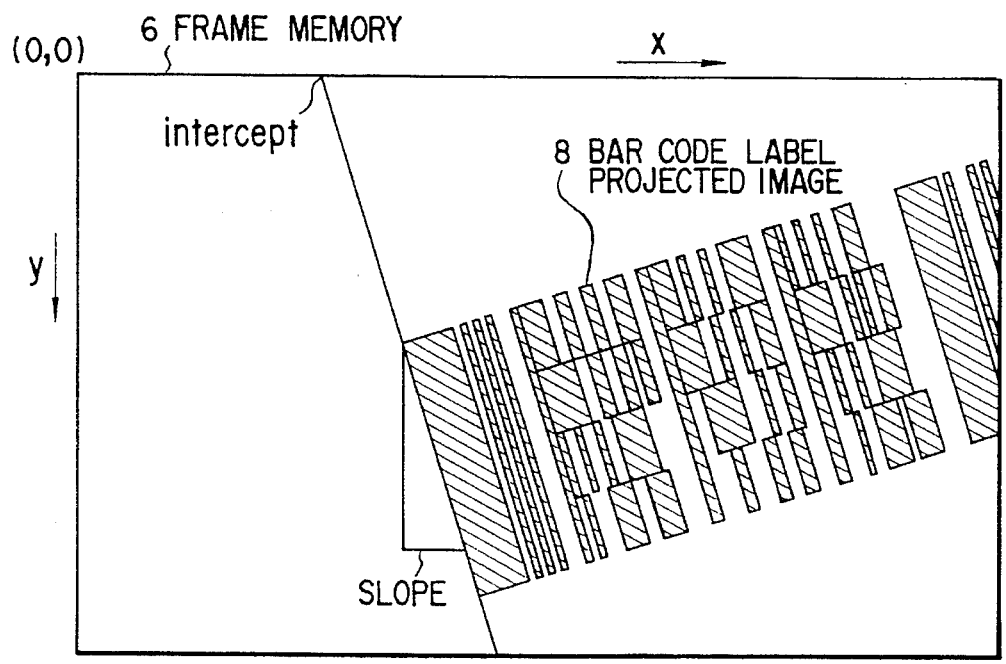
FIG. 9 shows the contents of a frame memory when an image of a bar code label of the PDF-417 code system has been taken in, for describing the method of finding the slope of the label.
Figure 14:
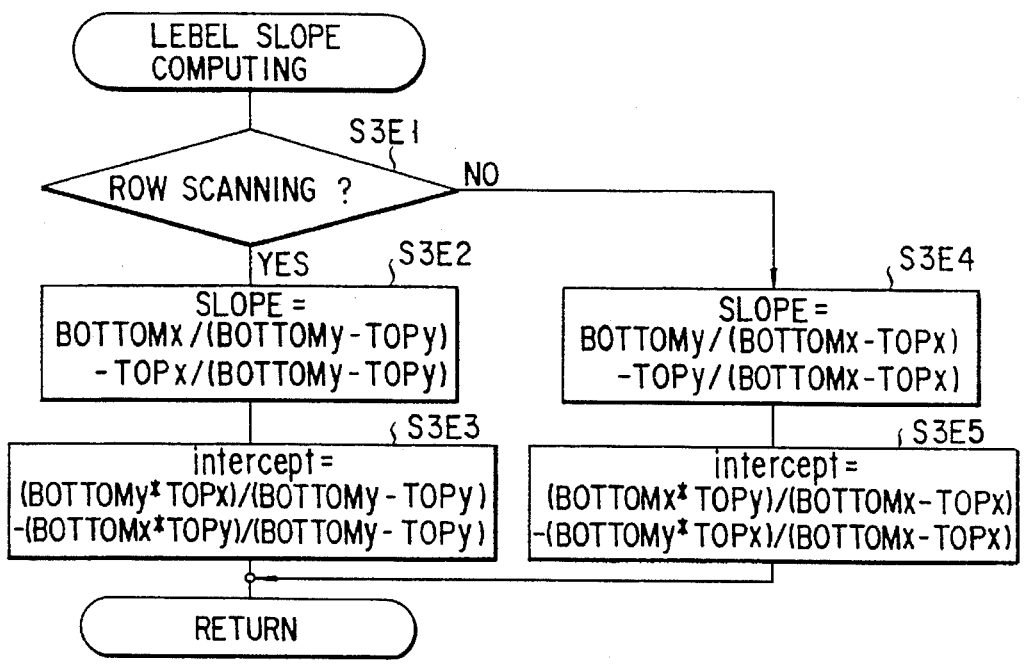
FIG. 14 is a flowchart for illustrating the routine for finding the slope of the label in FIG. 7.

Next, the label slope computing routine called in step S3E in the label sensing routine will now be described with reference to the flowchart of FIG. 14 and the explanatory diagram of FIG. 9 for obtaining the slope of the label in row scanning. FIG. 9 shows a case where the start code 22 is selected as a reference in row scanning.

First, it is judged whether or not row scanning is performed (step S3E1). If true, control goes to step S3E2. If column scanning is performed, control proceeds to step S3E4.

In the case of row scanning, the value of x-coordinate of coordinate variable BOTTOM is divided by the result of subtracting the value of y-coordinate of coordinate variable TOP from the value of y-coordinate of coordinate variable BOTTOM, and the value of x-coordinate of coordinate variable TOP is divided by the result of subtracting the value of y-coordinate of coordinate variable TOP from the value of y-coordinate of coordinate variable BOTTOM, and then the difference between these two quotients is stored in slope variable SLOPE (step S3E2). Next, the result of multiplying y-coordinate of coordinate variable BOTTOM by x-coordinate of coordinate variable TOP is divided by the result of subtracting the value of y-coordinate of coordinate variable TOP from the value of y-coordinate of coordinate variable BOTTOM, and the result of multiplying x-coordinate of coordinate variable BOTTOM by y-coordinate of coordinate variable TOP is divided by the result of subtracting the value of y-coordinate of coordinate variable TOP from the value of y-coordinate of coordinate variable BOTTOM. Then, the difference of these two quotients is stored in intercept variable "intercept" (step S3E3). In FIG. 14, the superscript asterisk (*) means multiplication sign x.

In the case of column scanning, the value of y-coordinate of coordinate variable BOTTOM is divided by the result of subtracting the value of x-coordinate of coordinate variable TOP from the value of x-coordinate of coordinate variable BOTTOM, and the value of y-coordinate of coordinate variable TOP is divided by the result of subtracting the value of x-coordinate of coordinate variable TOP from the value of x-coordinate of coordinate variable BOTTOM, and then the difference between these two quotients is stored in slope variable SLOPE (step S3E4). Next, the result of multiplying x-coordinate of coordinate variable BOTTOM by y-coordinate of coordinate variable TOP is divided by the result of subtracting the value of x-coordinate of coordinate variable TOP from the value of x-coordinate of coordinate variable BOTTOM, and the result of multiplying y-coordinate of coordinate variable BOTTOM by x-coordinate of coordinate variable TOP is divided by the result of subtracting the value of x-coordinate of coordinate variable TOP from the value of x-coordinate of coordinate variable BOTTOM. Then, the difference of these two quotients is stored in intercept variable "intercept" (step S3E5).

Figure 15:
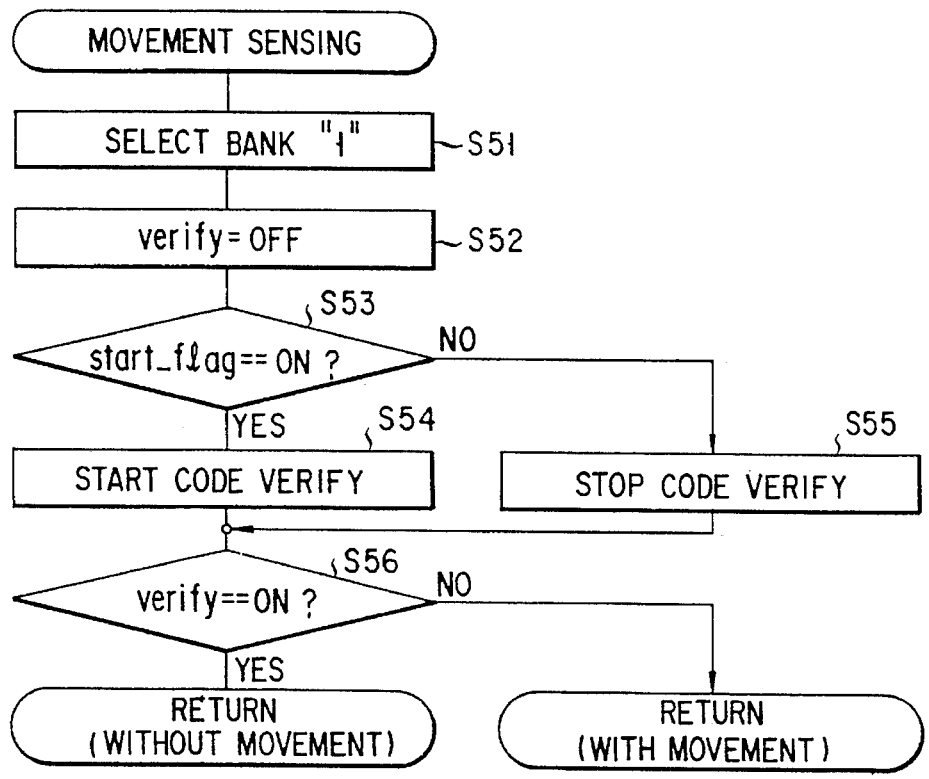
FIG. 15 is a flowchart for illustrating the movement sensing routine in FIG. 4.

The movement sensing routine called in step S5 will now be described by referring to the flowchart of FIG. 15.

This time, Bank1 6B of the frame memory 6 is selected for the image data to be processed (step S51), and the movement sensing flag "verify" is initialized to the off state (step S52). Then, it is judged whether the start sensing flag "start_flag" is on or not (step S53). If it is on, a start code verifying routine described later is called (step S54) to verify the start code 22. If it is off, a stop code verifying routine described later is called (step S55) to verify the stop code 23. Then, by judging whether the movement sensing flag "verify" is on or not (step S56), the verify result is judged. If the movement sensing flag "verify" is on, control returns with information on sensing movement, and if it is off, control returns with information on sensing no movement.

Figure 16B:
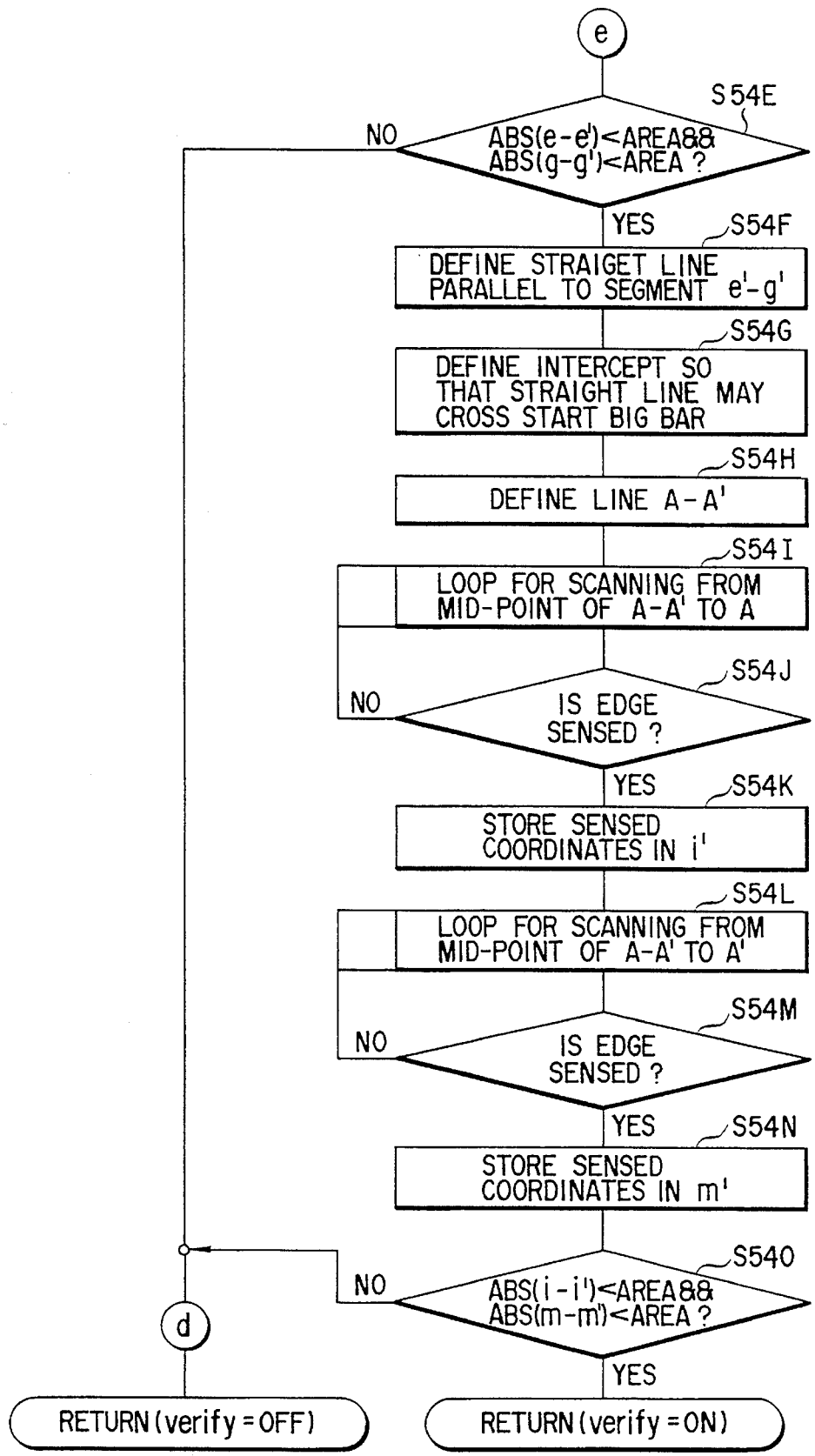

Next, the start code verifying routine called in step S54 in the movement sensing routine will now be described by referring to the flowchart of FIGS. 16A and 16B. In the figure, the coordinate marked with (') indicates the position sensed in image 1 (Bank1 6B). Specifically, coordinates e are assumed to be obtained by the label sensing routine called in step S3. They are the coordinates at which the start code 22 sensed in image 0 (Bank0 6A) is found for the first time. On the other hand, coordinates e' are obtained by scanning image 1 (Bank1 6B) under the same conditions (the scanning direction and scanning position) as the case of finding coordinates e. Therefore, if there is no label movement between image 0 and image 1, then coordinates e and e' will be the same. If the value of image movement error range AREA is set to, e.g. 2, it will be judged that the image has not moved, provided the difference in coordinates e between images is within ±1 pixel in the x- and y-directions.

It is judged whether row scanning is performed or not (step S541). If row scanning is performed, control goes to step S542, and if column scanning is performed, control proceeds to step S548.

In the case of row scanning, first, the image data on the line indicated by the value of y-coordinate of coordinate variable e sensed in Bank0 6A is taken in from Bank1 6B (step S542), and it is judged whether or not the start code 22 is sensed (step S543). If not, control returns with information on movement sensing flag "verify"=OFF to a higher-level routine. If the start code 22 is sensed, the sensed coordinates are stored in coordinate variable e' (step S544). Then, this time, the image data on the line indicated by the value of y-coordinate of coordinate variable g sensed in Bank0 6A is taken in from Bank1 6B (step S545), and it is judged whether or not the start code 22 is sensed (step S546). If not, control returns with information on movement sensing flag "verify"=OFF to a higher-level routine. If the start code 22 is sensed, the sensed coordinates are stored in coordinate variable g' (step S547) and then control proceeds to step S54E.

On the other hand, in the case of column scanning, first, the image data on the line indicated by the value of x-coordinate of coordinate variable e sensed in Bank0 6A is taken in from Bank1 6B (step S548), and it is judged whether or not the start code 22 is sensed (step S549). If not, control returns with information on movement sensing flag "verify"=OFF to a higher-level routine. If the start code 22 is sensed, the sensed coordinates are stored in coordinate variable e' (step S54A). Then, the image data on the line indicated by the value of x-coordinate of coordinate variable g sensed in Bank0 6A is taken in from Bank1 6B (step S54B), and it is judged whether or not the start code 22 is sensed (step S54C). If not, control returns with information on movement sensing flag "verify"=OFF to a higher-level routine. If the start code 22 is sensed, the sensed coordinates are stored in coordinate variable g' (step S54D).

Then, the absolute value of the difference between coordinate variables e and e' and that of the difference between coordinate variables g and g' are computed. It is judged whether they are within the movement error range AREA (step S54E). If not, control returns with information on movement sensing flag "verify"=OFF to a higher-level routine.

As described above, in steps S541 through S54E, it is judged whether coordinates e and g sensed in Bank0 6A are within the permissible error in Bank1 6B.

If it is judged that they are within the permissible error, an equation for a straight line parallel to segment e'-g' is defined: for example, $y=ax+b$ is defined as an equation for segment e'-g' (step S54F). Next, an intercept b is defined so that the straight line may cross the start big bar 22A (step S54G). After a line crossing the start big bar 22A has been obtained, the intersections of the line and the equation defining the screen are determined as A and A', respectively (step S54H).

Then, the image data is examined sequentially, starting at the mid-point of line A-A' to point A (step S54I) to check to see if there is an edge (step S54J). When an edge is sensed this way, the sensed coordinates are stored in coordinate variable i' (step S54K). That is, the sensed coordinates are defined as point i'.

Next, the image data is examined sequentially, starting this time at the mid-point of line A-A' to point A' (step S54L) to check to see if there is an edge (step S54M). When an edge is sensed this way, the sensed coordinates are stored in coordinate variable m' (step S54N). That is, the sensed coordinates are defined as point m'.

Then, the absolute value of the difference between coordinate variables i and i' and that of the difference between coordinate variables m and m' are computed. It is judged whether they are within the movement error range AREA (step S54O). If not, control returns with information on movement sensing flag "verify"=OFF to a higher-level routine. If true, control returns with information on movement sensing flag "verify"=ON to a higher-level routine.

As described above, in steps S54F through S54O, it is judged whether or not coordinates i and m sensed in Bank0 6A are within the permissible error in Bank1 6B. If all are within the permissible range, the movement flag "verify" is turned on and control is returned. If any one is outside the permissible range, the movement sensing flag "verify" is turned off and control is returned.

Figure 17B:
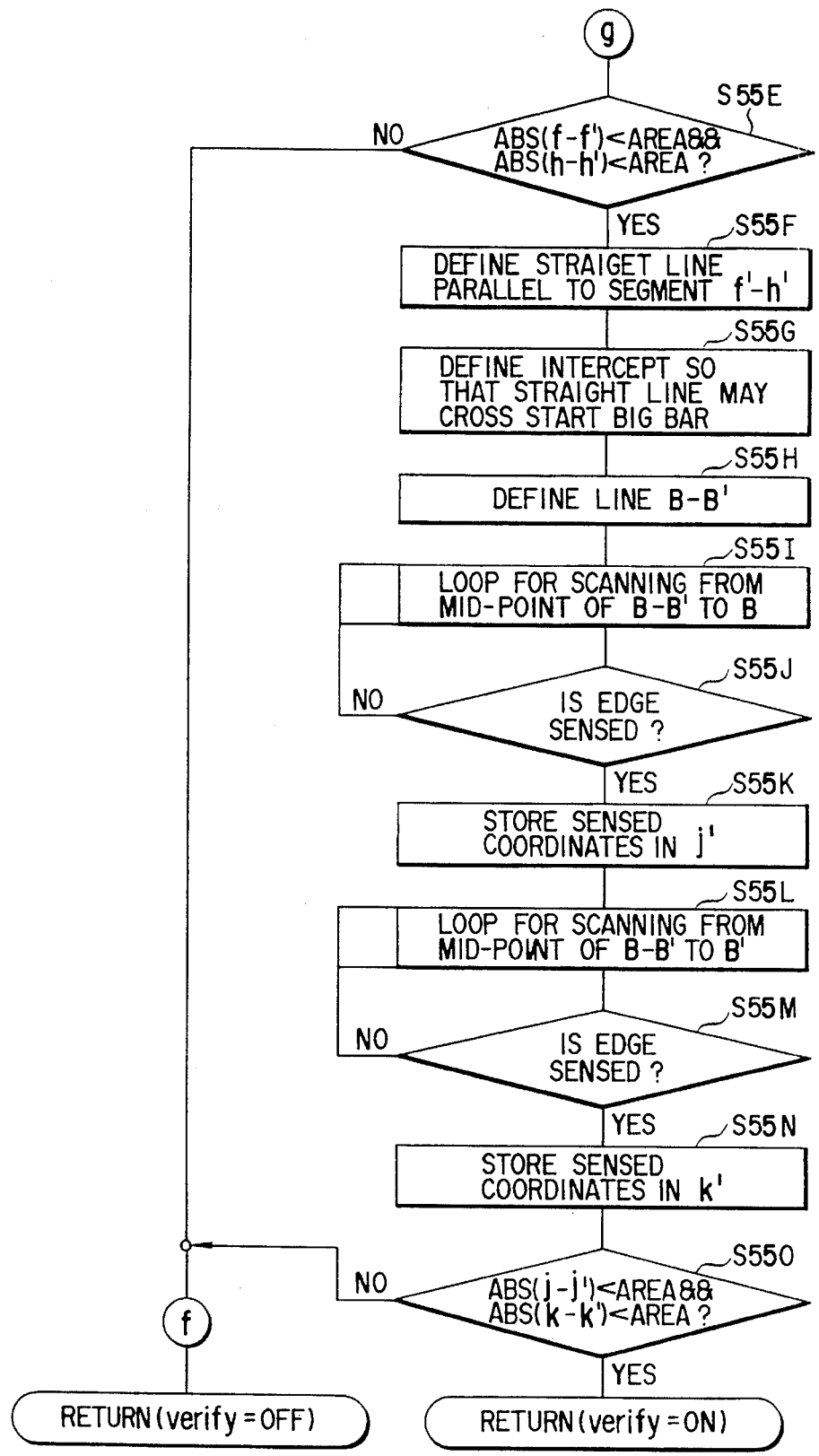

Next, the stop code verifying routine called in step S55 in the movement sensing routine will now be described with reference to the flowchart of FIGS. 17A and 17B. This stop code verifying routine is almost the same as the start code verifying routine.

It is judged whether row scanning is performed or not (step S551). If row scanning is performed, control goes to step S552, and if column scanning is performed, control proceeds to step S558.

In the case of row scanning, first, the image data on the line indicated by the value of y-coordinate of coordinate variable f sensed in Bank0 6A is taken in from Bank1 6B (step S552), and it is judged whether or not the stop code 23 is sensed (step S553). If not, control returns with information on movement sensing flag "verify"=OFF to a higher-level routine. If the stop code 23 is sensed, the sensed coordinates are stored in coordinate variable f' (step S554). Then, this time, the image data on the line indicated by the value of y-coordinate of coordinate variable h sensed in Bank0 6A is taken in from Bank1 6B (step S555), and it is judged whether or not the stop code 23 is sensed (step S556). If not, control returns with information on movement sensing flag "verify"=OFF to a higher-level routine. If the stop code 23 is sensed, the sensed coordinates are stored in coordinate variable h' (step S557) and then control proceeds to step S55E.

On the other hand, in the case of column scanning, first, the image data on the line indicated by the value of x-coordinate of coordinate variable f sensed in Bank0 6A is taken in from Bank1 6B (step S558), and it is judged whether or not the stop code 23 is sensed (step S559). If not, control returns with information on movement sensing flag "verify"=OFF to a higher-level routine. If the stop code 23 is sensed, the sensed coordinates are stored in coordinate variable f' (step S55A). Then, the image data on the line indicated by the value of x-coordinate of coordinate variable h sensed in Bank0 6A is taken in from Bank1 6B (step S55B), and it is judged whether or not the stop code 23 is sensed (step S55C). If not, control returns with information on movement sensing flag "verify"=OFF to a higher-level routine. If the stop code 23 is sensed, the sensed coordinates are stored in coordinate variable h' (step S55D).

Then, the absolute value of the difference between coordinate variables f and f' and that of the difference between coordinate variables h and h' are computed. It is judged whether they are within the movement error range AREA (step S55E). If not, control returns with information on movement sensing flag "verify"=OFF to a higher-level routine.

If it is judged that they are within the permissible range, an equation for a straight line parallel to segment f'-h' is defined: for example, $y=ax+b$ is defined as an equation for segment f'-h' (step S55F). Next, an intercept b is defined so that the straight line may cross the stop big bar 23A (step S55G). After a line crossing the stop big bar 23A has been obtained, the intersections of the line and the equation defining the screen are determined as B and B', respectively (step S55H).

Then, the image data is examined sequentially, starting at the mid-point of line B-B' to point B (step S55I) to check to see if there is an edge (step S55J). When an edge is sensed this way, the sensed coordinates are stored in coordinate variable j' (step S55K). That is, the sensed coordinates are defined as point j'.

Next, the image data is examined sequentially, starting this time at the mid-point of line B-B' to point B' (step S55L) to check to see if there is an edge (step S55M). When an edge is sensed this way, the sensed coordinates are stored in coordinate variable k' (step S55N). That is, the sensed coordinates are defined as point k'.

Then, the absolute value of the difference between coordinate variables j and j' and that of the difference between coordinate variables k and k' are computed. It is judged whether they are within the movement error range AREA (step S55O). If not, control returns with information on movement sensing flag "verify"=OFF to a higher-level routine. If true, control returns with information on movement sensing flag "verify"=ON to a higher-level routine.

Figure 18:
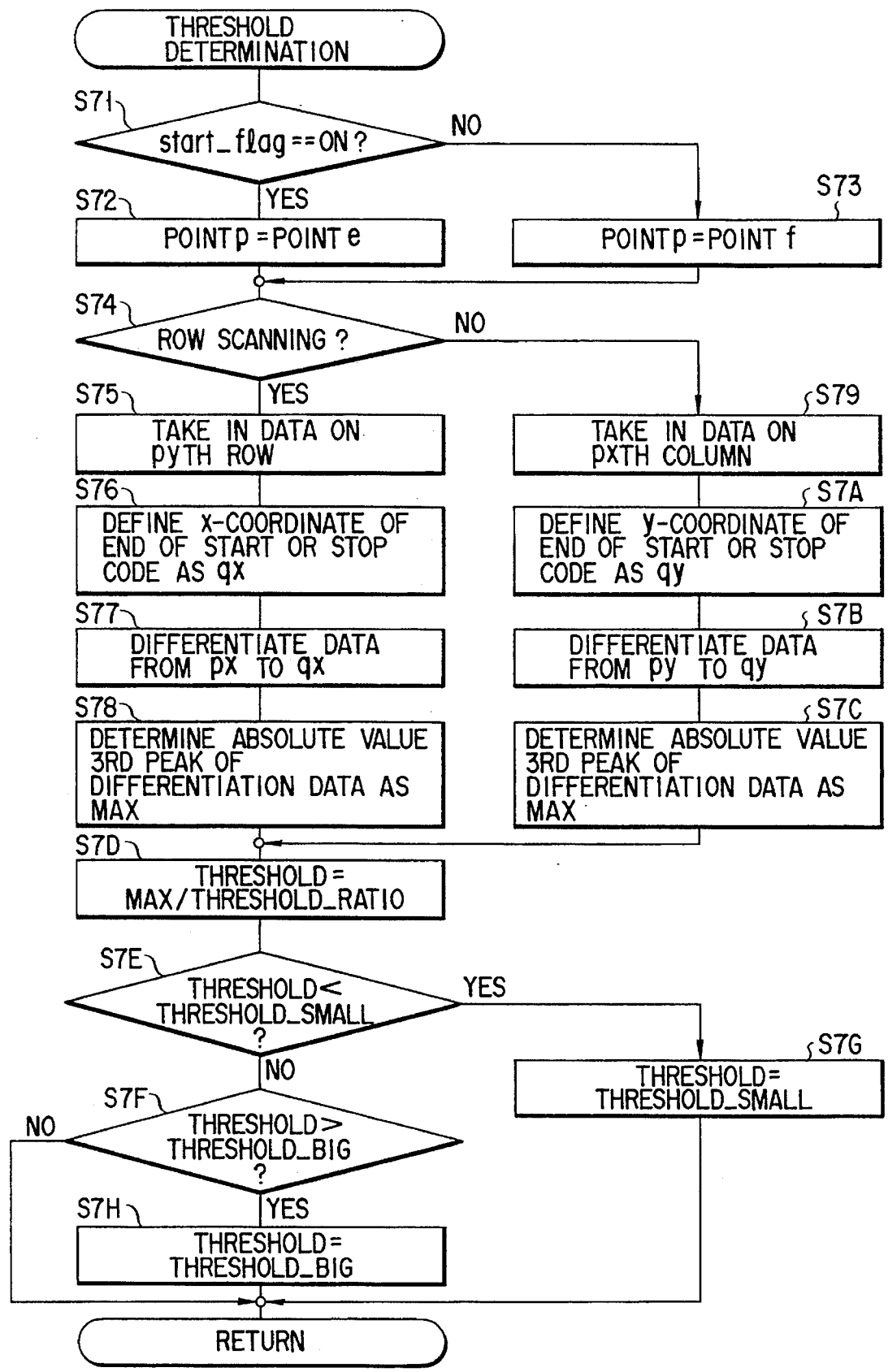
FIG. 18 is a flowchart for illustrating the threshold determining routine in FIG. 4.

The threshold determination routine called in step S7 will now be described with reference to the flowchart of FIG. 18.

It is judged whether or not the start sensing flag start_flag is ON, i.e. whether the start code 22 or stop code 23 has been selected as code to be processed in the label sensing routine called in step S3 (step S71). In the case of the start code 22, the value of point e is substituted into the value of point p (step S72). In the case of the stop code 23, the value of point f is substituted into the value of point p (step S73). That is, the coordinates of the start point of the data sequence for determining the threshold value are stored in the coordinate variable p. Thereby, the coordinates of the start point in the case of, e.g. the start code 22, are determined, as shown in FIG. 19.

Next, it is judged whether row scanning is performed or not (step S74). In the case of row scanning, control goes to step S75. In the case of column scanning, control goes to step S79. Specifically, in step S74, it is judged whether row scanning is performed or not, i.e. whether the direction for the process of finding coordinate variables e, f, g and h has been found. If "YES" in step S74, the processing from step S75 to S78 is carried out. If "NO" in step S74, the processing from step S79 to S7C is executed.

In the case of row scanning, the data on the line indicated by the value of y-coordinate of coordinate variable p, i.e. the data on the data take-in line as shown in FIG. 19, is taken in from Bank0 6A of the frame memory 6 (step S75), and the x-coordinate of the end of the start code 22 or stop code 23 is defined as the x-coordinate of point q (step S76). Then, the data from point p to point q is differentiated (step S77). Thereby, for example, in the case of the data take-in line shown in FIG. 19, a differential waveform of the start code 22, as shown in FIG. 20, is obtained. The absolute value of the third peak of the differential data is defined as variable MAX (step S78).

On the other hand, in the case of column scanning, the data on the line indicated by the value of x-coordinate of coordinate variable p is taken in from Bank0 6A of the frame memory 6 (step S79), and the y-coordinate of the end of the start code 22 or stop code 23 is defined as the y-coordinate of point q (step S7A). Then, the data from point p to point q is differentiated (step S7B). Thereby, the absolute value of the third peak of the differential data is defined as variable MAX (step S7C).

The reason why the third peak of differential data is observed is as follows. It is theoretically desired to determine the threshold at a point with the lowest contrast (i.e. with the lowest differential peak of an edge) within a bar code region. Thus, a third edge of the start code or stop code, at which the distance between the bar and space of the label is narrowest, is selected. Thereby, stable decoding can be possible, irrespective of the label size or label illumination condition.

The value of variable MAX thus obtained is divided by constant THRESHOLD_RATIO, and the resultant value is substituted into threshold variable THRESHOLD (step S7D). In other words, a threshold is temporarily obtained from the obtained data. The constant THRESHOLD_RATIO is a value by which the peak value is divided to obtain a threshold, and it is normally 2 or 3.

It is judged whether or not the temporarily obtained threshold THRESHOLD is greater than minimum threshold constant THRESHOLD_SMALL (step S7E) and whether or not it is less than maximum threshold constant THRESHOLD_BIG (step S7F). That is, it is judged whether the temporarily obtained threshold is within the permissible range. If it is greater than THRESHOLD_BIG, a maximum value indicated by THRESHOLD_BIG is substituted into threshold variable THRESHOLD, i.e. the threshold is set at a maximum value (step S7H). If the temporarily obtained threshold is less than THRESHOLD_SMALL, a minimum value represented by THRESHOLD_SMALL is substituted into threshold variable THRESHOLD, i.e. the threshold is set at a minimum value (step S7G).

Figure 21:
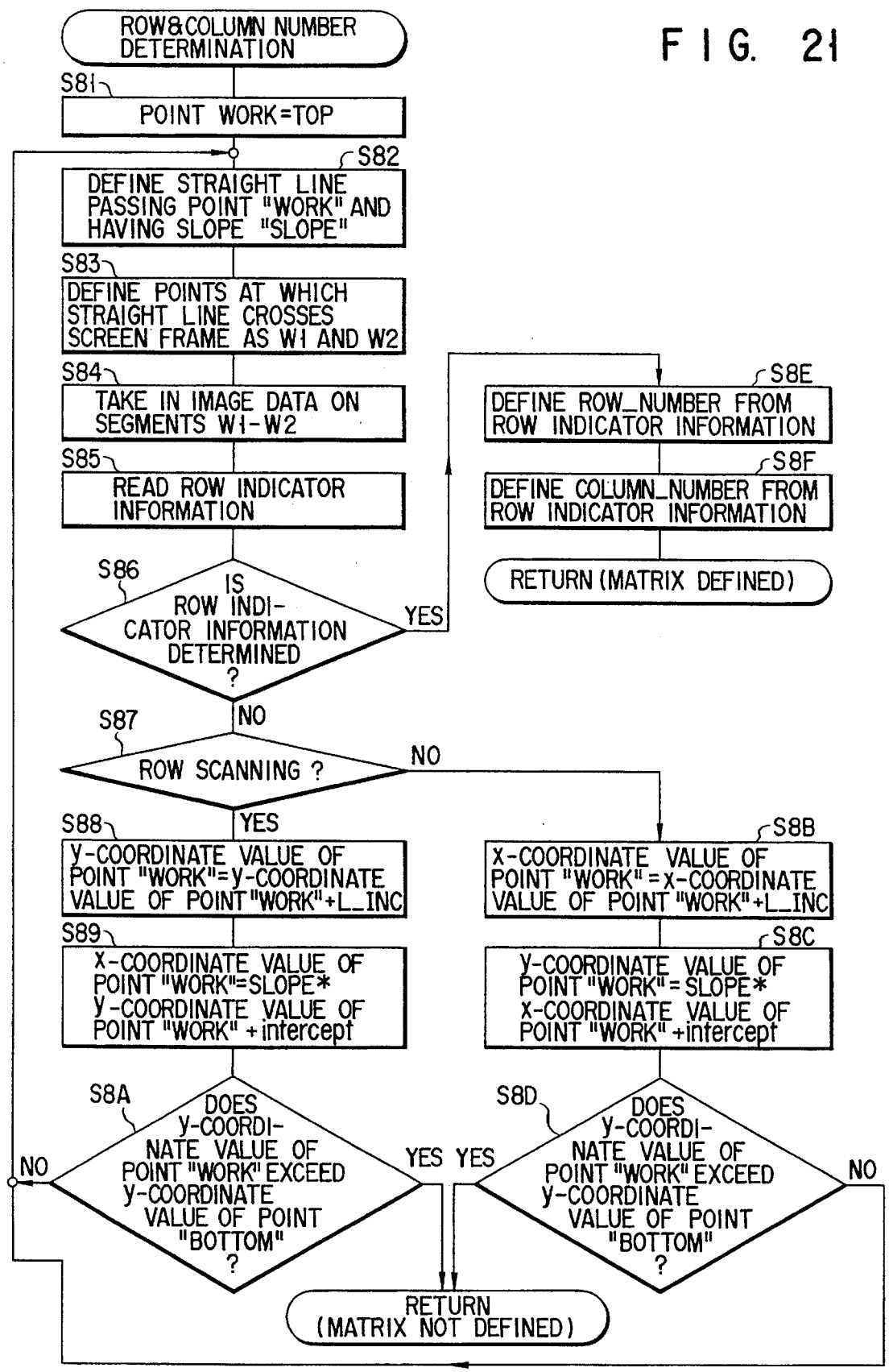
FIG. 21 is a flowchart for illustrating the row/column number sensing routine in FIG. 4.

The row & column number determination routine called in step S8 will now be described with reference to the flowchart of FIG. 21 and FIG. 22 showing the contents of the frame memory. FIG. 22 shows an example in which the start code 22 is selected as a reference in row scanning.

The value of label top coordinates TOP is stored in coordinate variable WORK as a start point of reference coordinates for reading row indicator information (step S81). A straight line 1 passing coordinate variable WORK and having label slope variable SLOPE is defined (step S82), and the points at which the line crosses the screen frame are defined as W1 and W2 (step S83). The image data on segment W1-W2 is taken in (step S84) and the row indicator information contained therein is read (step S85).

The row indicator information is read as follows. An edge is sensed from the image data on the line obtained in step S84, i.e. monochromatic pixel value, and the edge is converted to width information. Based on the width information, the start code 22 is sensed. Since it is known that the code next to the start code 22 is the row indicator 21A, it is taken in. Similarly, the stop code 23 is sensed. Since it is known that the code just before the stop code 23 is the row indicator 21A, the row indicator 21A is read. Once the row indicator 21A has been read, it is compared with the bar code table (not shown) and a coincidence portion is converted to codes, i.e. information on the number of rows, the number of columns, security level, etc. There are several methods of conversion to width information. For example, conversion is effected by calling a conversion-to-width-information routine as described later.

It is then checked whether the row indicator information has been determined (step S86). If "YES" in step S86, control goes to step S8E. If "NO" in step S86, control goes to step S87. In this context, "determination" means that the row indicator 21A is read several times and the reliability of information is enhanced sufficiently. For example, when the information (number of rows, number of columns, security level) written in the row indicator 21A has been read ten times, if the same information is obtained ten times, the row indicator information has been "determined."

If the row indicator information has not been determined, it is judged whether or not row scanning is performed (step S87). If row scanning is performed, control goes to step S88, and if column scanning is performed, control goes to step S8B.

In the case of row scanning, a predetermined increment L_INC is added to the y-coordinate value of coordinate variable WORK, and the result is substituted into the y-coordinate value of the new coordinate variable WORK (step S88). Further, the label slope variable SLOPE is multiplied by the y-coordinate value of the coordinate variable WORK, and the label intercept variable "intercept" is added to the multiplied result, and then the result is substituted into the x-coordinate value of the new coordinate variable WORK (step S89). In this way the reference coordinates for new scanning are reset in the coordinate variable WORK. Then, it is judged whether the y-coordinate value of the reset coordinate variable WORK exceeds the y-coordinate value of the label bottom coordinate variable BOTTOM, i.e. whether the former is within the label region (step S8A). If "NO" in step S8A, the control routine is repeated from step S82. If "YES" in step S8A, control is returned with information to the effect that "matrix not defined."

Similarly, In the case of column scanning, a predetermined increment L_INC is added to the x-coordinate value of coordinate variable WORK, and the result is substituted into the x-coordinate value of the new coordinate variable WORK (step S8B). Further, the label slope variable SLOPE is multiplied by the x-coordinate value of the coordinate variable WORK, and the label intercept variable "intercept" is added to the multiplied result, and then the result is substituted into the y-coordinate value of the new coordinate variable WORK (step S8C). In this way the reference coordinates for new scanning are reset in the coordinate variable WORK. Then, it is judged whether the y-coordinate value of the reset coordinate variable WORK exceeds the y-coordinate value of the label bottom coordinate variable BOTTOM, i.e. whether the former is within the label region (step SSD). If "NO" in step S8D, the control routine is repeated from step S82. If "YES" in step S8D, control is returned with information to the effect that "matrix not defined."

If "YES" in step S86, the number of rows of the label obtained from the row indicator information is stored in the label row number variable ROW_NUMBER (step S8E). Then, the number of columns of the label is extracted from the row indicator information and stored in the label column number variable COLUMN_NUMBER (step S8F). Thereafter, control returns to a higher-level routine with information "matrix defined."

Figure 23A:
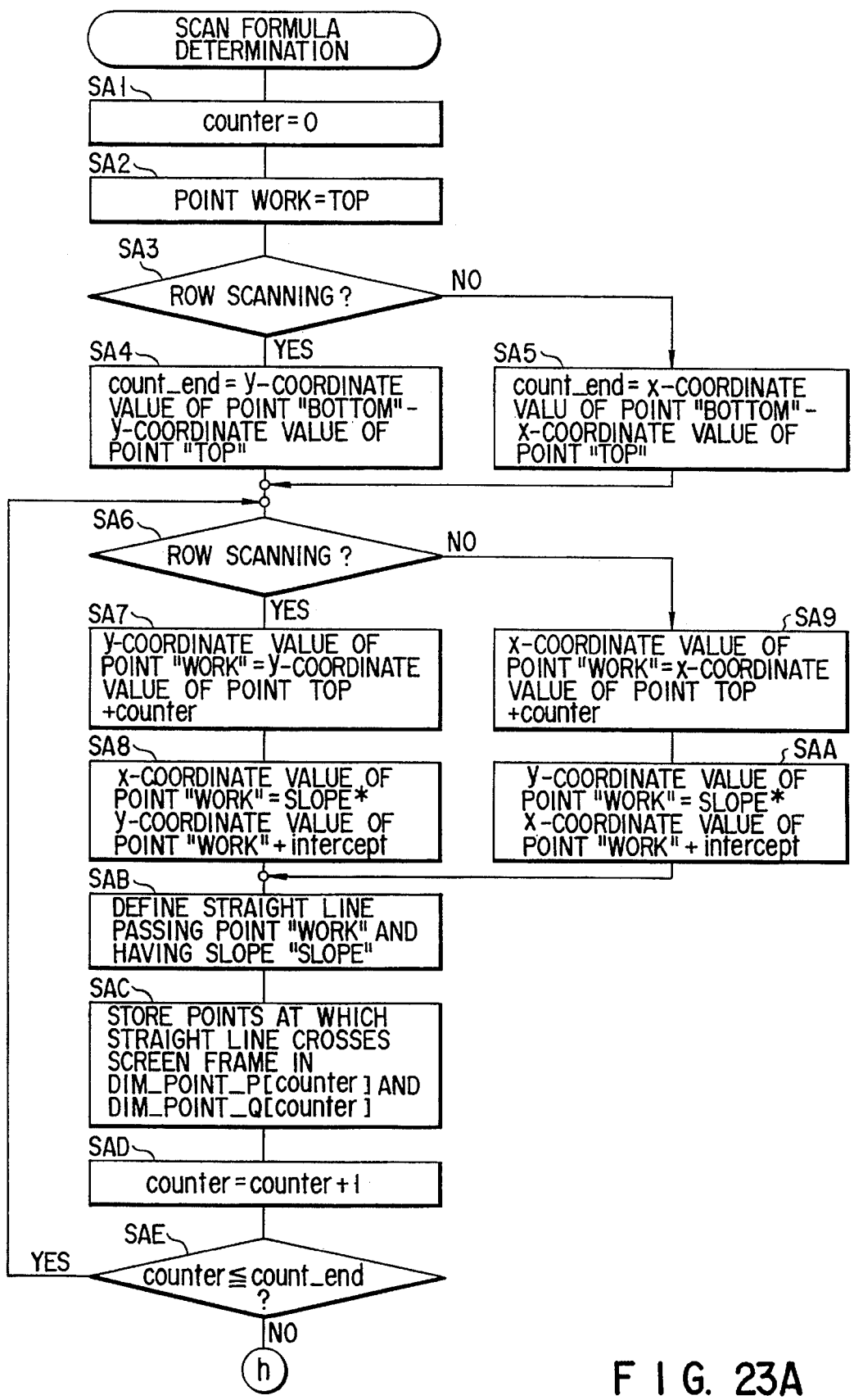
FIG. 23A and FIG. 23B are flowcharts for describing the scan formula determining routine.
Figure 23B:
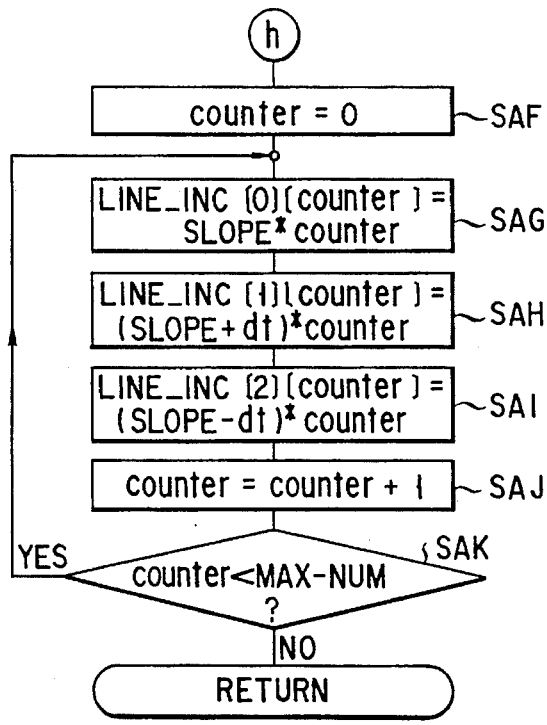

The scan formula determination routine called in step SA will now be described with reference to the flowcharts of FIGS. 23A and 23B and FIG. 24 showing the contents of the frame memory. FIG. 24 shows an example in which the start code 22 is selected as a reference in row scanning.

Specifically, the variable "counter" is initialized to 0 (step SA1) and the reference coordinate variable WORK is initialized to the value of label top coordinate variable TOP (step SA2).

It is judged whether row scanning or column scanning is performed (step SA3). In the case of row scanning, the difference between the y-coordinate value of the label bottom coordinate variable BOTTOM and the y-coordinate value of the label top coordinate variable TOP is substituted into variable "count_end" (step SA4). That is, the number of patterns to be determined (i.e. the number of pixels in the column direction of the label in FIG. 24) is computed and stored in variable "count_end". In other words, the number of patterns is the number of patterns for scanning the entire label.

Similarly, in the case of column scanning, the difference between the x-coordinate value of the label bottom coordinate variable BOTTOM and the x-coordinate value of the label top coordinate variable TOP is substituted into variable "count_end" (step SA5).

Again, it is judged whether row scanning or column scanning is performed (step SA6). In the case of row scanning, the value of variable "counter" is added to the y-coordinate value of the label top coordinate variable TOP and the result is substituted into the y-coordinate value of the reference coordinate variable WORK (step SA7). Further, the value of the label slope variable SLOPE is multiplied by the y-coordinate value of the reference coordinate variable WORK, and the label intercept variable "intercept" is added to the multiplied result, and then the result is substituted into the x-coordinate value of the new reference coordinate variable WORK (step SAS). In this way the reference coordinate variable WORK is reset in accordance with the increase in the value of variable "counter."

Similarly, in the case of column scanning, the value of variable "counter" is added to the x-coordinate value of the label top coordinate variable TOP and the result is substituted into the x-coordinate value of the reference coordinate variable WORK (step SA9). Further, the value of the label slope variable SLOPE is multiplied by the x-coordinate value of the reference coordinate variable WORK, and the label intercept variable "intercept" is added to the multiplied result, and then the result is substituted into the y-coordinate value of the new reference coordinate variable WORK (step SAA).

Next, a straight line l passing the reset coordinate variable WORK and having a slope indicated by the label slope variable SLOPE is defined (step SAB). The two points at which the straight line l crosses the screen frame are computed and stored in the counter numbers of DIM_POINT_P and DIM_POINT_Q of coordinate variable array (i.e. the numbers of array indicated by the value of variable "counter") (step SAC).

Thereafter, the variable "counter" value is increased (step SAD) and it is judged whether the reset variable "counter" value has reached a necessary number, i.e. variable "counter_end" (step SAE). If "YES" in step SAE, control returns to step SA6. If "NO" in step SAE, control goes to step SAF. By the above operation, the combination of the start and end points for sequentially scanning the label is defined.

Subsequently, variable "counter" is initialized to 0 once again (step SAF). The value of label slope variable SLOPE is multiplied by variable "counter", so that the increment due to the position of computed label slope SLOPE is found. The computed result is stored in a predetermined location (indicated by variable "counter") of two-dimensional variable array LINE_INC [0] (step SAG). The sum of the value of label slope variable SLOPE and a predetermined slope correction amount dt is multiplied by variable "counter" value. Thus, the increment due to the sum of computed label slope SLOPE and predetermined correction amount dt is computed. The computed result is stored in a predetermined location of two-dimensional variable array LINE_INC [1] (step SAH). Further, the difference between the value of label slope variable SLOPE and the slope correction amount dt is multiplied by variable "counter" value so that the increment due to the position computed by subtracting slope correction amount dt from label slope SLOPE is computed. The computed result is stored in a predetermined location of two-dimensional variable array LINE_INC [2] (step SAI).

Thereafter, variable "counter" is increased (step SAJ) and it is judged whether the reset variable "counter" has not reached maximum array size constant MAX_NUM (step SAK). If "YES" in step SAK, control returns to step SAG. If "NO" in step SAK, control returns to a higher-level routine.

By the loop of steps SAF to SAK, three slope patterns for taking in one-line label information are obtained.

The maximum array size constant MAX_NUM indicates the size of a variable determined at the time of forming a program. For example, when the size of frame memory 6 is assumed to be 640×640 pixels, constant MAX_NUM may be about 1000.

Figure 26:
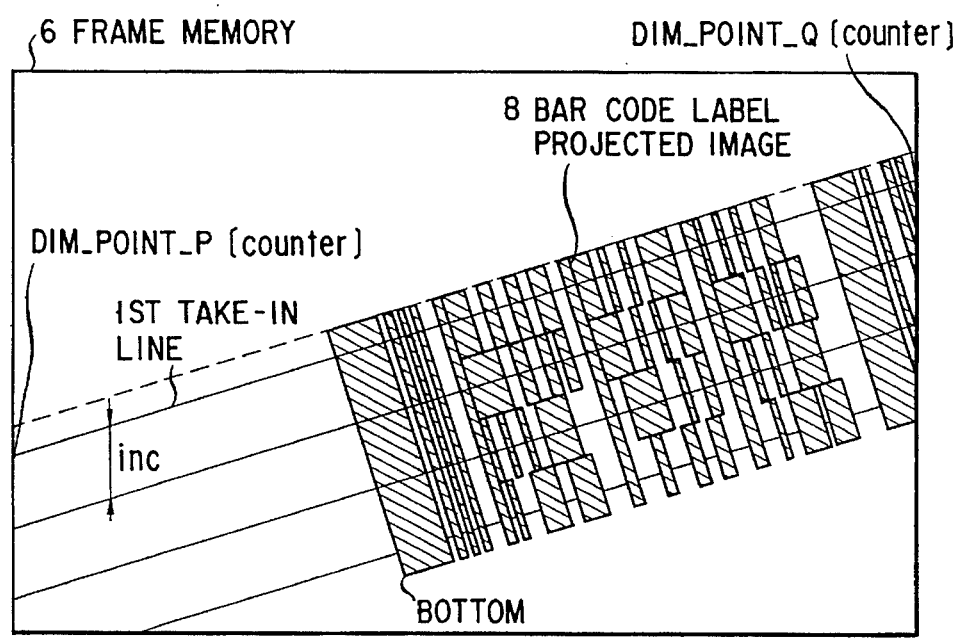
FIG. 26 shows the contents of a frame memory when an image of a bar code label of the PDF-417 code system has been taken in, for describing the optimal scan method.
Figure 25:
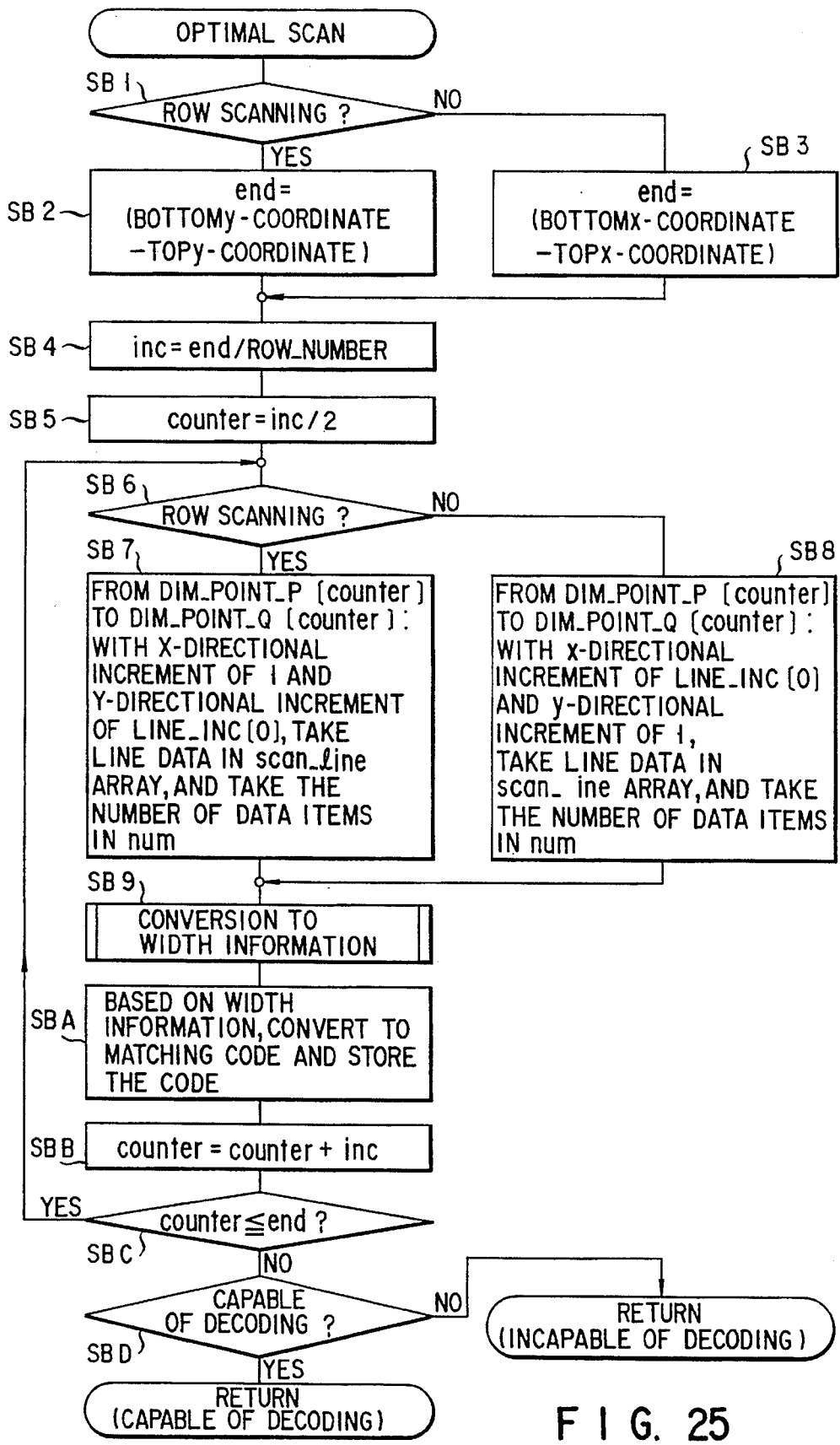
FIG. 25 is a flowchart for describing the optimal scan routine in FIG. 4.

Referring to the flowchart of FIG. 25 and the projected image in the frame memory shown in FIG. 26, the optimal scan routine called in step SB will now be described. FIG. 26 shows an example in which the start code 22 is selected as a reference in row scanning. For the purpose of simpler description, the case of row scanning is described. When row scanning is not performed, the processing in step SB2 described below is replaced by step SB3, and the processing in step SB7 is by step SB8.

In the case of row scanning (step SB1), the difference between the y-coordinate value of label bottom coordinate variable BOTTOM and the y-coordinate value of label top coordinate variable TOP, i.e. the number of pixels in the y-direction of the label, is computed, and the computed result is stored in variable "end" (step SB2). The value of variable "end" is divided by the number of rows of the label (variable ROW_NUMBER) and thereby the interval for scanning the center of each row once is computed, as shown in FIG. 26. The computed result is stored in variable "inc" (step SB4). The interval variable "inc" is divided by 2 to compute an initial bias for scanning the center. The initial bias is set as the initial value of variable "counter" (step SB5).

Subsequently, in the case of row scanning (step SB6), the scan start and end points in the current variable "counter" value are computed from the coordinate variable arrays DIM_POINT_P and DIM_POINT_Q. With the x-directional increment of 1 and y-directional increment of slope increment array LINE_INC [0], one-line image data is taken out from Bank0 6A of frame memory 6 and is stored in take-in buffer array scan_line and the number of data items is stored in variable num (step SB7).

A conversion-to-width-information routine (described below) is called (step SB9), and the taken-out data is converted to width information. Then, based on the width information, a portion matching with the bar code table (not shown) is converted to a code and corresponding information is stored (step SBA).

Then, the variable "counter" is reset on the basis of the increment, i.e. the value of interval variable inc (step SBB), and it is judged whether the reset variable "counter" value is equal to or less than variable "end", i.e. label range (step SBC). If "YES" in step SBC, control returns to step SB6. If "NO" in step SBC, control goes to step SBD. Specifically, it is judged whether the information written on the label can be completely decoded from the stored code information (step SBD). If "YES" in step SBD, control goes to a higher-level routine with information "capable of decoding." If "NO" in step SBD, control goes to a higher-level routine with information "incapable of decoding."

The skip scan routine called in step SD will now be described. The skip scan routine is substantially identical to the optimal scan routine, except the following points:

1. In the optical scan routine, only a single scan is performed for one row of the label, whereas in the skip scan routine all the surface of the label is scanned if a decoding condition is not met. Suppose that all label information is A and the amount of highly reliable determined code is B. The amount of undetermined code is A-B. If A-B is less than the recoverable amount defined by the security level and is judged to be proper after recovery, the decoding condition is met.

2. In the skip scan routine, scan is performed with two patterns obtained by adding a slope correction amount, when one-line image is taken in.

Figure 27:
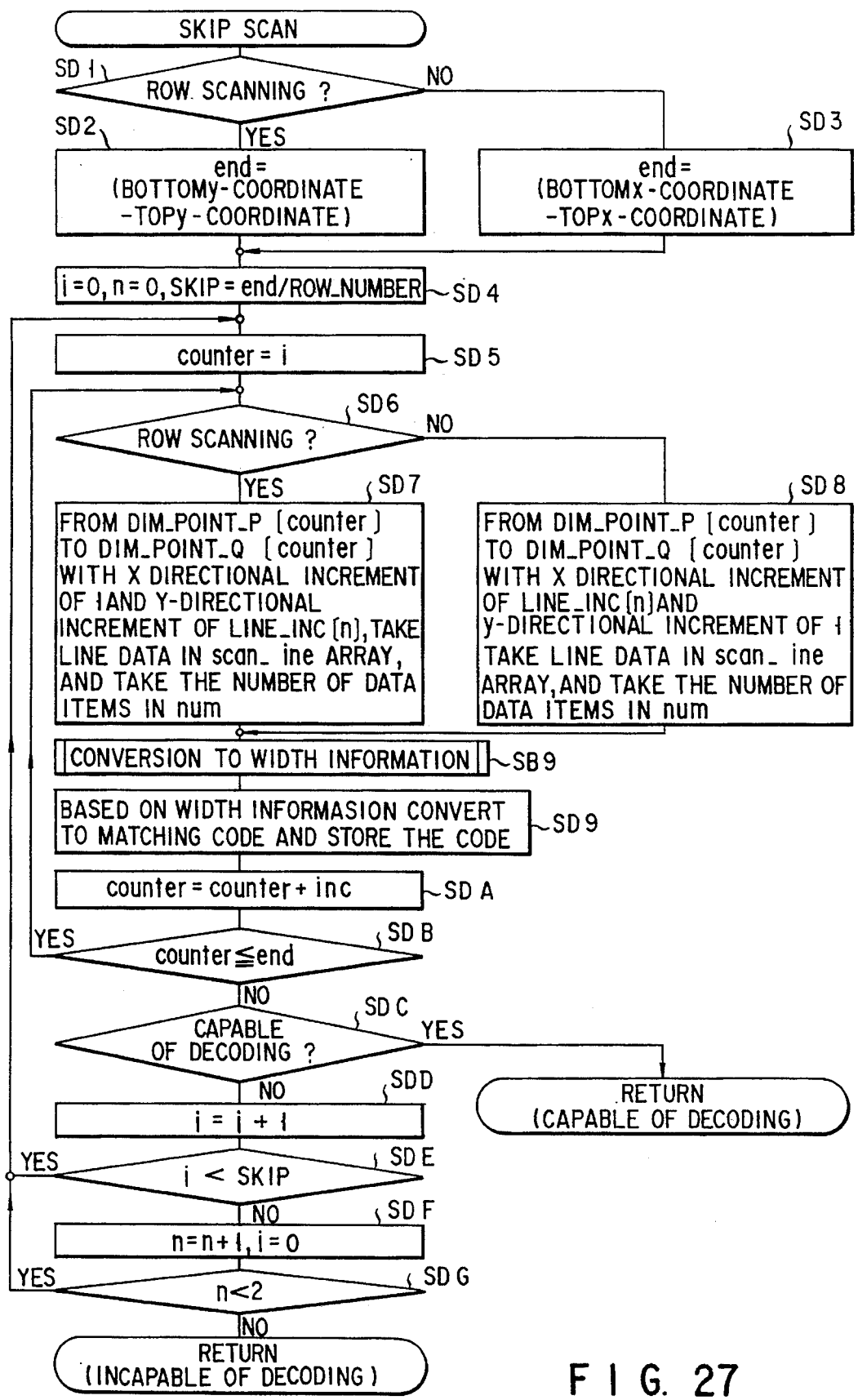
FIG. 27 is a flowchart for describing the skip scan routine in FIG. 4.

Now referring to the flowchart of FIG. 27, the skip scan routine will be described. For the purpose of simpler description, the case of row scanning is described. When row scanning is not performed, the processing in step SD2 described below is replaced by step SD3, and the processing in step SD7 is by step SD8.

In the case of row scanning (step SD1), the difference between the y-coordinate value of label bottom coordinate variable BOTTOM and the y-coordinate value of label top coordinate variable TOP, i.e. the number of pixels in the y-direction of the label, is computed, and the computed result is stored in variable "end" (step SD2). Variables i and n are initialized to 0, and the value of variable "end" is divided by the number of rows of the label (variable ROW_NUMBER) and thereby the interval for scanning the center of each row once is computed, as shown in FIG. 26. The computed result is stored in variable SKIP (step SD4). The value of variable i is defined as the set value of variable "counter" (step SD5).

Subsequently, in the case of row scanning (step SD6), the scan start and end points in the current variable "counter" value are computed from the coordinate variable arrays DIM_POINT_P and DIM_POINT_Q. With the x-directional increment of 1 and y-directional increment of slope increment array LINE_INC [n], one-line image data is taken out from Bank0 6A of frame memory 6 and is stored in take-in buffer array scan_line and the number of data items is stored in variable num (step SD7).

A conversion-to-width-information routine (described below) is called (step SD8), and the taken-out data is converted to width information. Then, based on the width information, a portion matching with the bar code table (not shown) is converted to a code and corresponding information is stored (step SD9).

Then, the variable "counter" is reset on the basis of the increment, i.e. the value of variable SKIP (step SDA), and it is judged whether the reset variable "counter" value is equal to or less than variable "end", i.e. label range (step SDB). If "YES" in step SDB, control returns to step SD6. If "NO" in step SDB, control goes to step SDC.

Specifically, it is judged whether the information written on the label can be completely decoded from the stored code information (step SDC). If "YES" in step SDC, control goes to a higher-level routine with information "capable of decoding."

If "NO" in step SDC, variable i is increased (step SDD) and it is judged whether the reset variable i is less than variable SKIP (step SDE). If "YES" in step SDE, control returns to step SD5. If "NO" in step SDE, variable n is increased and variable i is reset to 0 (step SDF). Then, it is judged whether the reset variable n is less than 2 (step SDG). If "YES" in step SDG, control returns to step SD5. If "NO" in step SDG, control goes to a higher-level routine with information "incapable of decoding."

In the skip scan routine, the label is scanned the number of times of SKIP. That is, since quick operation is required, scan is performed at intervals of SKIP and the label code on each column is read quickly, thereby judging whether decoding can be effected. If decoding can be effected, this routine is immediately finished even if the entire data of Bank0 6A of the frame memory 6 has not been scanned. By repeating this scan the number of times of SKIP, it can be assumed that the entire Bank0 6A has been scanned. In this example, the SKIP is varied in accordance with the label size. The SKIP may be a constant (e.g. 3 or 4), but it can be varied in accordance with the label size or the like in order to reduce the number of times of label scan trials and realize high-speed operation.

Figure 28A:
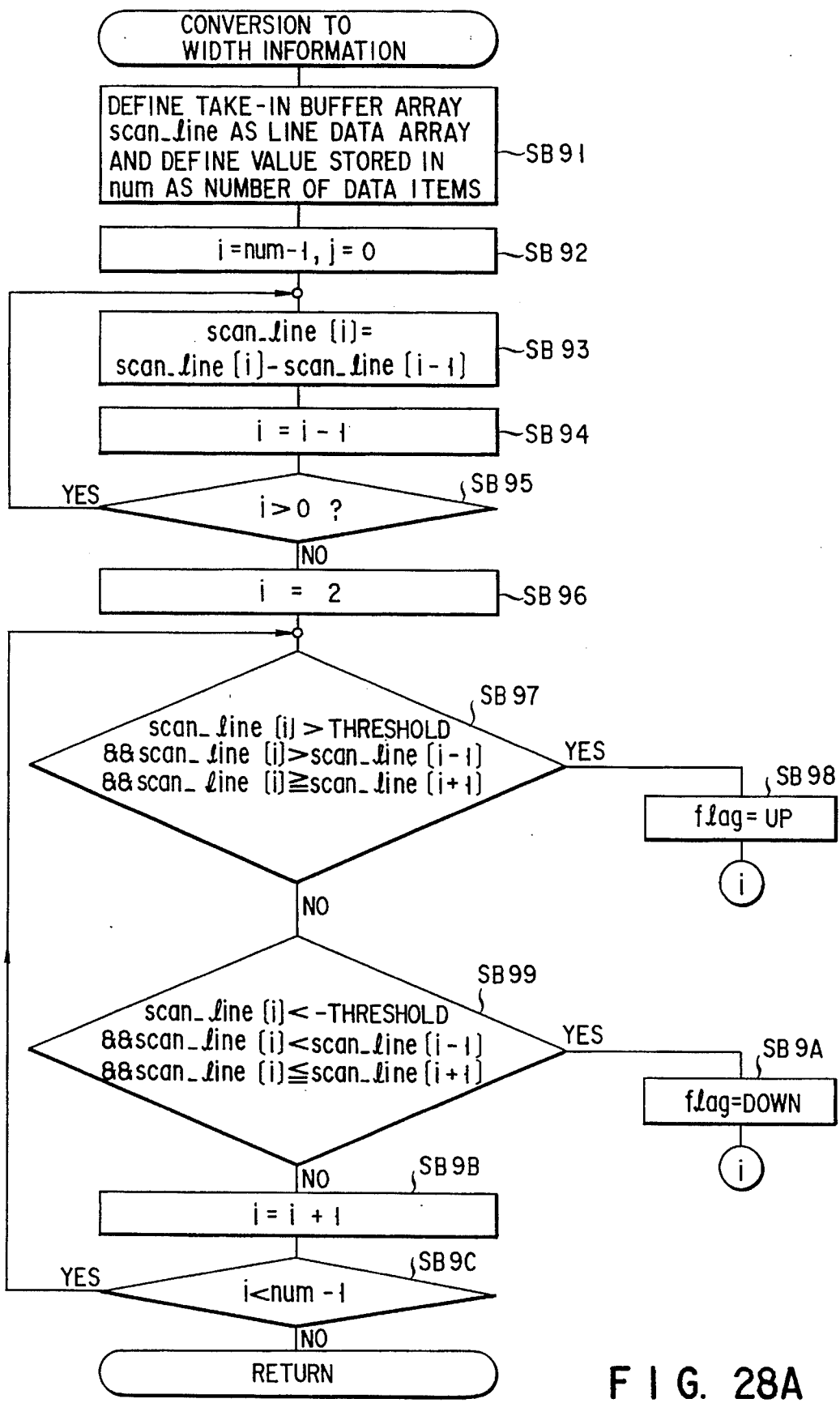
FIG. 28A and FIG. 28B are flowcharts for describing the conversion-to-width-information routine in FIGS. 25 and 27.
Figure 28B:
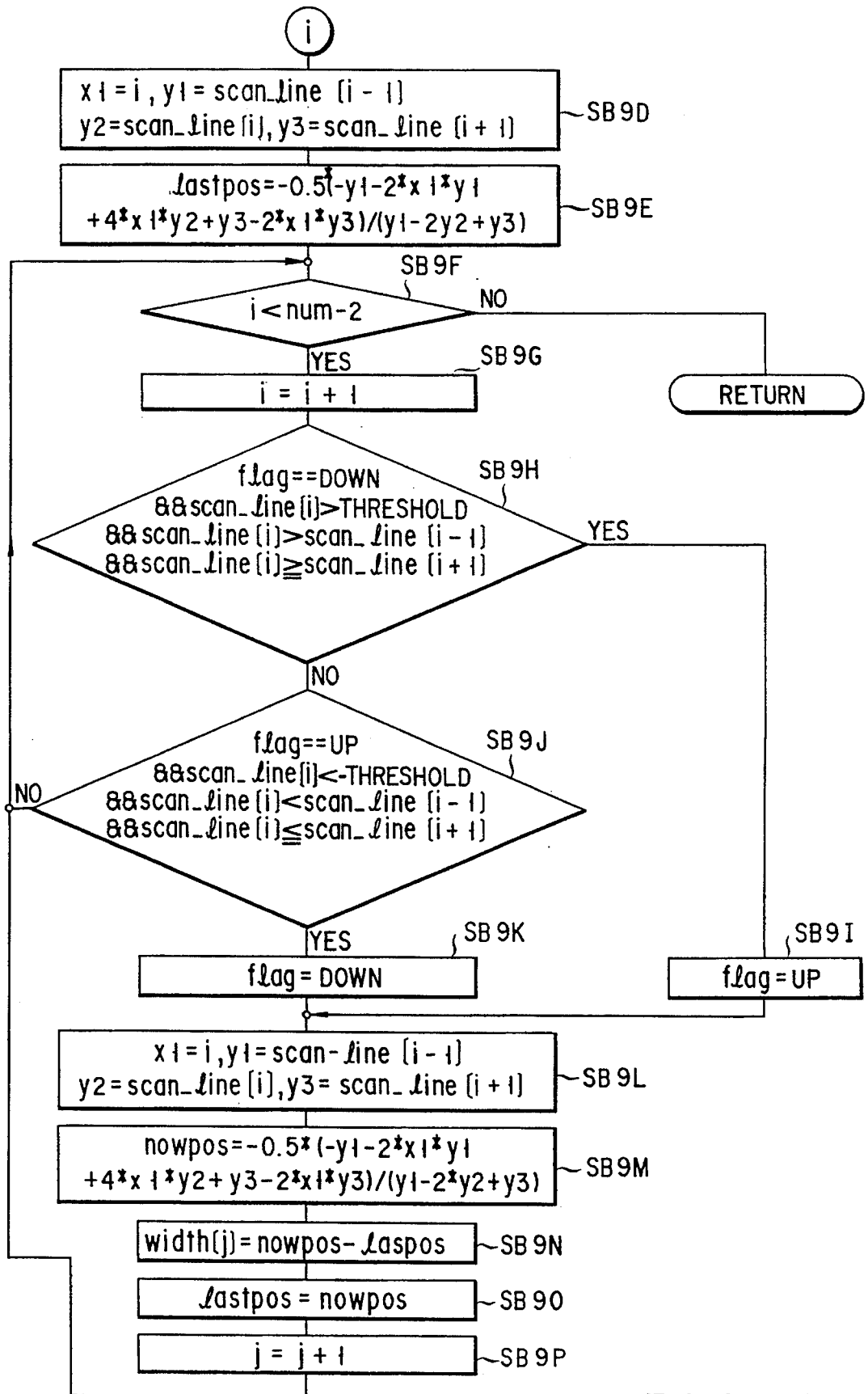

The conversion-to-width-information called in step SB8 will now be described with reference to the flowcharts of FIGS. 28A and 28B. In brief, this routine is carried out to compute the width between the bar and space of the label. A boundary between the bar and space is found by a differential signal and approximation is performed on the basis of a second-order curve, thereby obtaining a peak of data. Peak positions are successively obtained, and the width is obtained by finding the difference between the peak positions. In this case, the start code 22 and row indicator 21A, too, are converted to width information.

The buffer array scan_line taken in by the upper-level routine is defined as line data array, and the value stored in variable num is defined as the number of data items (step SB91). The value of variable num is decreased and the result is stored in position indicator counter i, and variable j is initialized to 0 (step SB92). The value of i-1-th position of taken-in buffer array scan_line is subtracted from the value of i-th position (indicated by position indicator counter i) of taken-in buffer array scan_line. The result is reset in the i-th position of taken-in buffer array scan_line (step SB93). Then, the position indicator counter i is decreased (step SB94) and it is judged whether the result is greater than 0 (step SB95). If "YES" in step SB95, control returns to step SB93. That is, line data is subjected to first-order differentiation in steps SB91 to SB95.

If "NO" in step SB95, position indicator counter i is initialized to 2 (step SB96), and it is judged whether or not the value of i-th position of taken-in buffer array scan_line is greater than threshold variable THRESHOLD, is greater than the value of i-1-th position of taken-in buffer array scan_line, and is equal to or greater than the value of i+1-th position of taken-in buffer array scan_line (step SB97). If "YES" in step SB97, code flag "flag" is set to "UP" (step SB98).

If "NO" in step SB97, it is judged whether or not the value of i-th position of taken-in buffer array scan_line is less than threshold variable with minus sign (-) "-THRESHOLD", is less than the value of i-1-th position of taken-in buffer array scan_line, and is equal to or less than the value of i+1-th position of taken-in buffer array scan_line (step SB99). If "YES" in step SB99, code flag "flag" is set to "DOWN" (step SB9A).

If "NO" in step SB99, the position indicator counter i is increased (step SB9B) and it is judged whether the result is less than the value obtained by subtracting 1 from the value of num (step SB9C). If "YES" in step SB9C, control goes not step SB97, and if "NO", control goes to a higher-level routine.

Figure 29:
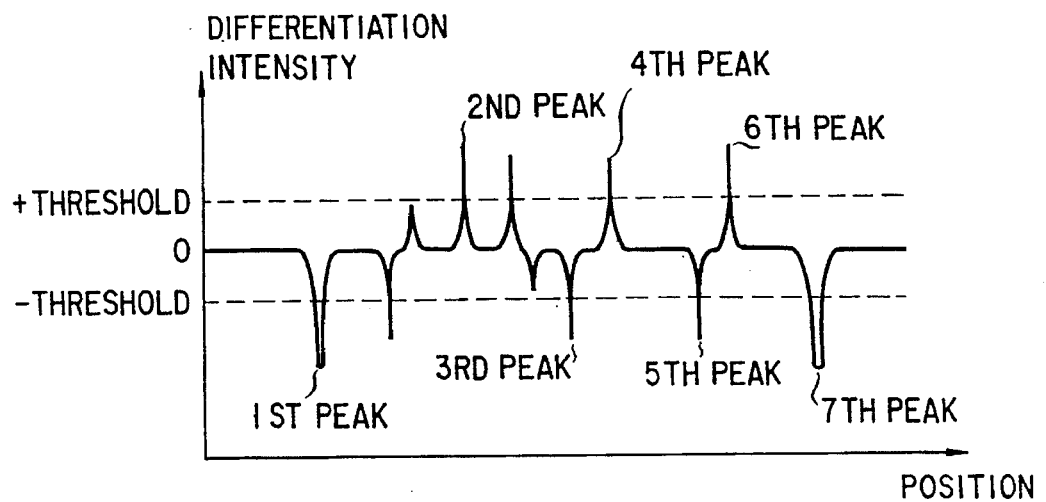
FIG. 29 is a view for describing the peak selection rule for width information conversion.

Specifically, in steps SB97 to SB9C, the first peak exceeding the value of threshold variable THRESHOLD, i.e. the first peak in FIG. 29, is sensed. If the sign of the sensed peak is positive (+), code flag "flag" is set to "UP" and control advances to step SB9D. If the sign of the sensed peak is minus (-), code flag "flag" is set to "DOWN" and control advances to step SB9D. If no peak is sensed by line data scan, control is returned to a higher-level routine.

If code flag "flag" is set, the value of position indicator counter i is set to $x_1$, the value of i-1-th position of taken-in buffer array scan_line is set to $y_1$, the value of i-th position of taken-in buffer array scan_line is set to $y_2$, and the value of i+1-th position of taken-in buffer array scan_line is set to $y_3$. Thus, the sensed peak position and adjacent both data items are subjected to fitting by a second-order curve (step SB9D). Then, the following calculation is performed:

$$\frac{-0.5(-y_1 - 2x_1y_1 + 4x_1y_2 + y_3 - 2x_1y_3)}{y_1 - 2y_2 + y_3}$$

Thus, the peak position of the second-order curve is obtained. The result is stored in variable "lastpos" (step SB9E).

Thereafter, it is judged whether the value of position indicator counter i is less than the value obtained by subtracting 2 from the value of variable num (step SB9F). If "NO" in step SB9F, control is returned to a higher-level routine.

If "YES" in step SB9F, position indicator counter i is increased (step SB9G). It is judged whether or not code flag "flag" is "DOWN", and the value of i-th position of taken-in buffer array scan_line is greater than threshold variable THRESHOLD, is greater than the value of i-1-th position of taken-in buffer array scan_line, and is equal to or greater than the value of i+1-th position of taken-in buffer array scan_line (step SB9H). If "YES" in step SB9H, code flag "flag" is set to "UP" (step SB9I).

If "NO" in step SB9H, it is judged whether or not code flag "flag" is "UP", and the value of i-th position of taken-in buffer array scan_line is less than threshold variable with minus sign (−) "−THRESHOLD," is less than the value of i-1-th position of taken-in buffer array scan_line, and is equal to or less than the value of i+1-th position of taken-in buffer array scan_line (step SB9J). If "NO" in step SB9J, control returns to step SB9F. If "YES", code flag "flag" is set to "DOWN" (step SB9K).

If code flag "flag" is reset, the value of position indicator counter i is set to $x_1$, the value of i-1-th position of taken-in buffer array scan_line is set to $y_1$, the value of i-th position of taken-in buffer array scan_line is set to $y_2$, and the value of i+1-th position of taken-in buffer array scan_line is set to $y_3$. Thus, the sensed peak position and adjacent both data items are subjected to fitting by a second-order curve (step SB9L). Then, the following calculation is performed:

$$\frac{-0.5(-y_1 - 2x_1y_1 + 4x_1y_2 + y_3 - 2x_1y_3)}{y_1 - 2y_2 + y_3}$$

Thus, the peak position of the second-order curve is obtained. The result is stored in variable "nowpos" (step SB9M).

Figure 30:
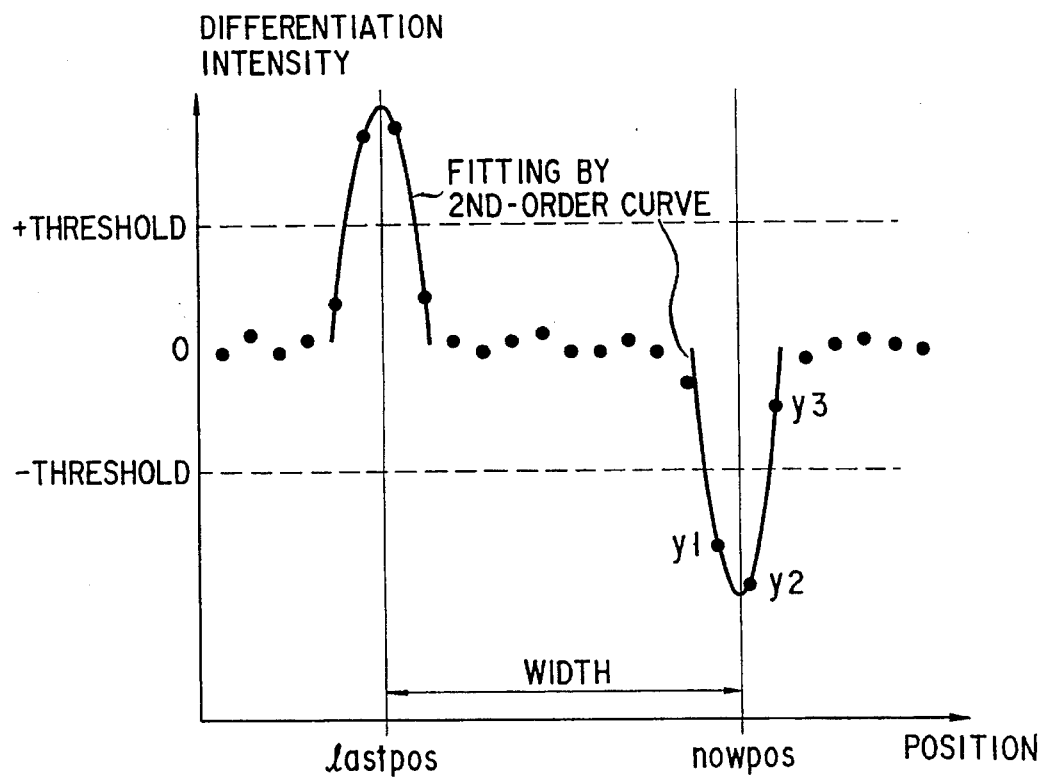
FIG. 30 shows two peak positions for calculating an inter-peak distance.

Thereby, as shown in FIG. 30, the previous peak position "lastpos" and the current peak position "nowpos" are obtained. By finding the difference between these two peak positions, the inter-peak distance is computed and the computed result is stored at a position indicated by variable j of width information storage array variable "width" (step SB9N).

Then, the peak position variable "lastpos" is updated to peak position variable "nowpos" (step SB9O), variable i is increased (step SB9P), and control is returned to step SB9F.

In steps SB9F to SB9P, the peaks are sensed successively and the inter-peak distance is stored in width information storage array variable "width." The peak sensing process in steps SB9F to SB9P differs from that in steps SB97 to SB9C in that when the current code flag "flag" is, e.g. "DOWN", the peak to be found next is a positive (+) peak.

As is clear from the above, the bar code label 2 can be read even if the label 2 is situated at any rotational angle. The apparatus of the present invention has the following features:

(1) The label position is computed by using such patterns as start code 22 and/or stop code 23 which is hardly present naturally. Thus, even if character information, etc., which is other than bar code information, is present within the sensing area, only the bar code label 2 can stably be extracted and read.

(2) when the label position is estimated, one of the start code 22 and stop code 23 is used and the start point and end point of the take-in line are defined on the screen frame. Thus, even if part of the label sticks out of the screen, the label information can be extracted.

(3) As has been described in connection with the pre-processing routine, start/stop code sensing routine, and scan & sense routine, the increment is varied at the time of the start/stop code sensing, depending on specified cases. Thus, such a situation is prevented from arising, that the label cannot be sensed at a specified rotational angle.

(4) The image data items of two screens are stored in the frame memory 6 sequentially. Thus, the label position information units of the two screens are compared, and thereby presence of movement is sensed and efficient scanning can be performed.

(5) The threshold value, which is an important parameter in extracting bar code information of the label is computed on the basis of the value of a third edge of the start code 22 or stop code 23, which has the least width of the bar or space of the label. Thus, stable decoding can be achieved irrespective of the label size or label illumination condition.

(6) Prior to the skip scan routine, the optimal scan routine is executed in which a single data take-out scan operation is performed for each row on the basis of the size (number of rows, number of columns) of the label and the size of the label on the screen. Thus, when decoding is possible by the optical scan, the label read time can be reduced.

(7) In general, labels may be touched by men or damaged during transportation. It is possible that the slope of a damaged label is not correctly computed. If decoding is disabled by reading label information with such an estimated label slope as a reference, slope correction is performed and then label information is read. Thus, the label information can be estimated even if the label slope is not exactly determined.

(8) When a label is imaged, there is a problem as to what number of pixels constitute a module size or a minimum line width (i.e. the space interval next to the big bar 22A of start code 22). The number of pixels is decreased even when the label is inclined (1/1.414 . . . at 45°). Thus, fitting based on a second-order curve is performed, and the width of the bar and space is computed from the inter-peak distance. Thereby, correct label information can be determined even if the minimum line width of the label is decreased. In addition, when the minimum line width is large, label information is determined without fitting based on second-order curve. However, there is an increasing demand that the label size be reduced. Further, with conventional label printing machines, the thickness of a space portion is less than that of a bar. Therefore, this technique for fitting is very important.

The present invention is not limited to the above embodiment, and various modifications can, of course, be made.

For example, the two-dimensional imaging apparatus 5 is not limited to an apparatus having an area sensor like a two-dimensional CCD or an imaging tube. A one-dimensional imaging element may be combined with a one-dimensional scanning mechanism, or a photoelectric detector may be combined with a two-dimensional scanning mechanism.

In addition, in the above description, the bar code label of PDF-417 format is employed. However, a stacked bar code of Code 49, or a one-dimensional bar code of JAN, etc. may be used.

As has been described above in detail, the present invention can provide a symbol information reading apparatus capable of reading bar code symbol information even if a bar code label (in particular, stacked bar code label) is set in any direction on a label sensing surface of the reading apparatus, or a picked-up image of the bar code label is defective.

Specifically, a label position is estimated on the basis of at least two of the four corner points of a projected image of a bar code label, and data can be extracted substantially in parallel to the label. Therefore, the angle of the label does not adversely affect the reading performance of the apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A symbol information reading apparatus, comprising:
    imaging means for obtaining a two-dimensional image of a bar code including bars and spaces, said imaging means including a frame memory for storing the obtained two-dimensional image of the bar code;
    position sensing means for sensing at least two points of a predetermined pattern determined in accordance with the type of the bar code, the predetermined pattern including first and second predetermined patterns, the at least two points being the positions of two corners of either one of the first and second predetermined patterns so as to read information of the bar code, even if an image of another of the first and second predetermined patterns is not stored in the frame memory, said position sensing means including:
        skip reading means for successively reading the information of the bar code from the frame memory in a predetermined direction at a predetermined interval,
        first sensing means for sensing the two points on the basis of an initial read position and a last read position of either one of the first and second predetermined patterns determined in accordance with the type of the bar code, said initial read position and said last read position being determined by said skip reading means,
        read control means for successively reading information of the bar code from the frame memory at a predetermined interval in a direction perpendicular to the predetermined direction of the skip reading means, when the two points cannot be sensed by the first sensing means, and
        means for judging the information of the bar code in either of the predetermined direction and the perpendicular direction, when sensing the two points by means of the sensing means, even if the other of the first and second predetermined patterns is not sensed;
    slope sensing means for sensing a slope of the bar code from said two points sensed by the position sensing means; and
    reading means for successively reading information of the bar code from the two-dimensional image of the bar code obtained by the imaging means, on the basis of the information obtained by said slope sensing means.

2. The apparatus according to claim 1, wherein said sensing means includes:
    predetermined pattern sensing means for sensing either one of the first and second predetermined patterns from the data read by said skip reading means;
    formula defining means for defining a formula of a straight line extending in parallel to a straight line connecting the initial read position and the last read position of either one of the first and second predetermined patterns obtained by the predetermined pattern sensing means and crossing a first bar within either one of the first and second predetermined patterns;
    edge sensing means for obtaining intersections between the straight line defined by said formula obtained by said formula defining means and straight lines expressed by formulas for defining a screen frame of said frame memory, and sensing edge positions between a mid-point of a straight line connecting said intersections and said intersections; and
    predetermined position sensing means for drawing lines perpendicular to the straight line connecting said initial read position and said last read position from said edge positions sensed by said edge sensing means, and sensing intersections therebetween as the positions of said two points.

3. The apparatus according to claim 1, wherein said sensing means includes formula computing means for computing a slope and an intercept of a straight line connecting the positions of two points sensed by said sensing means, and obtaining a formula representing said straight line connecting the positions of the two points sensed by said sensing means.

4. The apparatus according to claim 3, wherein said reading means includes means for successively reading data of the frame memory in a direction perpendicular to the straight line represented by the formula obtained by said formula computing means.

5. The apparatus according to claim 1, wherein said bar code is a bar code of PDF-417 format, and said first predetermined pattern is either one of a start code and a stop code, and the second predetermined pattern is the other of the start code and stop code.

6. A symbol information reading apparatus, comprising:
    imaging means for imaging a bar code including bars and spaces, and storing a two-dimensional image of the bar code in a frame memory;
    skip reading means for successively reading the information of the bar code from the frame memory in a predetermined direction at a predetermined reading interval;
    position sensing means for sensing a predetermined pattern determined in accordance with the type of the bar code means of said skip reading means, and thereby sensing at least two points of said predetermined pattern;
    slope sensing means for sensing a slope of the bar code from the positions of said two points sensed by the position sensing means;
    reading means for successively reading information of the bar code from the two-dimensional image of the bar code stored in said frame memory, on the basis of the information obtained by said slope sensing means; and
    reading interval setting means for setting a first value and a second value alternately, as said predetermined reading interval of said skip reading means, each time said skip reading means reads the frame memory from the beginning to the end wherein said reading interval setting means includes a reading interval varying means for varying said predetermined reading interval alternately between the first or second value set by said reading interval setting means and a value obtained by adding 1 to the first or second value, in each of one-line read operations, each time said skip reading means reads the frame memory from the beginning to the end.

7. The apparatus according to claim 6, further comprising decoding means for decoding the information of the bar code obtained by said reading means and obtaining the original information.

8. The apparatus according to claim 6, wherein the positions of said at least two points are the positions of two corners of said predetermined pattern.

9. The apparatus according to claim 8, wherein said position sensing means includes sensing means for sensing the positions of said two points on the basis of an initial read position and a last read position of said predetermined pattern determined by said skip reading means, and said reading interval setting means includes means for varying said predetermined reading interval alternately between a third value, which is different from said first and second values and a value obtained by adding 1 to the third value, in each of one-line read operations, after said predetermined pattern has been initially read.

10. A symbol information reading apparatus, comprising:

imaging means for obtaining a two-dimensional image of a bar code of PDF-417 format including bars and spaces;

position sensing means for sensing at least two points of a predetermined pattern determined in accordance with the type of the bar code, on the basis of the two-dimensional image of the bar code obtained by said imaging means, said predetermined pattern being one of a start code and a stop code;

slope sensing means for sensing a slope of the bar code from the positions of said two points sensed by the position sensing means;

reading means for successively reading information of the bar code from the two-dimensional image of the bar code obtained by the imaging means, on the basis of the information obtained by said slope sensing means;

width information conversion means for differentiating data of each line read by said reading means, and comparing the differentiated data with a threshold, thereby converting the differentiated data to width information of the bar and space;

decoding means for decoding the information of the bar code to the original information, on the basis of the width information obtained by said width information conversion means; and threshold determining means for determining the threshold used by the width information conversion means, said threshold determining means including:

temporary threshold sensing means for sensing a predetermined pattern determined in accordance with the type of the bar code on the basis of the two-dimensional image of the bar code obtained by said position sensing means, differentiating line data obtained at this time, and selecting, from among a plurality of peaks of differential intensity, a predetermined peak value of a boundary between a bar with a least width and a space with a least width determined in accordance with the type of the bar code as a temporary threshold, said predetermined peak being the third peak, and formal threshold determining means for judging whether or not the temporary threshold determined by said temporary threshold sensing means is within a predetermined threshold value range, and, if the temporary threshold is within the predetermined threshold value range, determining the temporary threshold as a formal threshold.

11. The apparatus according to claim 10, wherein said formal threshold determining means includes means for determining, when the temporary threshold obtained by said temporary threshold sensing means falls out of said predetermined threshold value range, a maximum value of said predetermined threshold value range as a formal threshold, and determining, when the temporary threshold is less than a minimum value of said predetermined threshold value range, the minimum value as a formal threshold.

12. A symbol information reading apparatus, comprising:

imaging means for imaging a bar code including bars and spaces, and storing a two-dimensional image of the bar code in a frame memory, said bar code including portions indicating the number of rows and the number of columns of the bar code;

position sensing means for sensing at least two points of a predetermined pattern determined in accordance with the type of the bar code from said frame memory;

slope sensing means for sensing a slope of the bar code from the positions of said two points sensed by the position sensing means;

number-of-rows and number-of-columns sensing means for reading the information of the portions indicating the number or rows and the number of columns of the bar code from the two-dimensional image of the bar code stored in the frame memory, on the basis of the information obtained by said slope sensing means, and finding the number of rows and the number of columns of the bar code on the basis of the read information;

optimal read line computing means for computing an optimal read line for reading one-line data on each row of the bar code, from the size of the bar code image on the frame memory based on the positions of said two points sensed by the position sensing means, the slope of the bar code sensed by said slope sensing means, and the number of rows of the bar code sensed by said number-of-rows and number-of-columns sensing means;

reading means for successively reading the information of the bar code from the two-dimensional image of the bar code stored in the frame memory, on the line computed by said optimal read line computing means;

decoding means for decoding the information of the bar code obtained by the reading means and obtaining the original information;

judging means for judging whether or not the decoding by the decoding means can be effected on the basis of the information of the bar code obtained by the reading means; and angle correction means for obtaining a corrected slope by correcting the slope sensed by the slope sensing means by a predetermined degree when the judging means has judged that the decoding by the decoding means cannot be effected, and enabling the reading means to successively read the information of the bar code on the basis of the corrected slope.

13. The apparatus according to claim 12, wherein said reading means includes:

judging means for judging whether or not decoding to the original information is possible on the basis of the information on the optimal read line; and total-surface read means for successively reading, when said judging means has judged that decoding is not possible, the information of the bar code from the frame memory, on the basis of the positions of the two points sensed by the position sensing means and the slope of the bar code sensed by said slope sensing means.

14. The apparatus according to claim 13, wherein one of the positions of the two points sensed by the position sensing means is the position of a first sensed corner of the four corners of the bar code, and said total-surface read means includes:

height computing means for computing the height of each row, from the size of the bar code image on the frame memory based on the positions of said two points sensed by the position sensing means, and the number of rows of the bar code sensed by said number-of-rows and number-of-columns sensing means;

skip read means for successively reading the information of the bar code from the frame memory, with an interval corresponding to the height computed by said height computing means from the line including the position of said first sensed corner; and updating means for updating the read start position of the skip read means by one line, when the reading by the skip read means has reached the end of the frame memory.

15. The apparatus according to claim 12, wherein said slope sensing means includes formula computing means for computing a slope and an intercept of a straight line connecting the positions of the two points sensed by the position sensing means, and obtaining a formula expressing the straight line, said reading means includes means for successively reading the data of the frame memory in a direction perpendicular to the straight line expressed by the formula computed by said formula computing means, and said angle correction means includes means for computing a formula of a straight line which is obtained by correcting the slope of the straight line expressed by the formula computed by said formula computing means by a degree corresponding to said predetermined angle.

16. A symbol information reading apparatus, comprising:

imaging means for obtaining a two-dimensional image of a bar code including bars and spaces;

position sensing means for sensing at least two points of a predetermined pattern determined in accordance with the type of the bar code, on the basis of the two-dimensional image of the bar code obtained by said imaging means;

slope sensing means for sensing a slope of the bar code from the positions of said two points sensed by the position sensing means; reading means for successively reading information of the bar code from the two-dimensional image of the bar code obtained by the imaging means, on the basis of the information obtained by said slope sensing means;

width information conversion means for converting the data of each line read by said reading means to width information of the bar and space, said width information conversion means including:

differentiating means for differentiating the data of each line read by said reading means;

peak position computing means for comparing each of differential intensities obtained by said differentiating means with a threshold, and fitting peak positions of the differential intensities exceeding said threshold and data items on both sides of each peak position by second-order curves, thereby obtaining peak positions of each second-order curve; and width information outputting means for outputting, as said width information, the difference between adjacent ones of said peak positions computed by said peak position computing means; and decoding means for effecting decoding to the original information on the basis of the width information obtained by said width information outputting means.

* * * * *